(12) United States Patent
Ciliberti

(10) Patent No.: US 11,783,273 B1
(45) Date of Patent: Oct. 10, 2023

(54) SYSTEM AND METHOD FOR RECEIVING AND DELIVERING A MEDICAL PACKAGE

(71) Applicant: Express Scripts Strategic Development, Inc., St. Louis, MO (US)

(72) Inventor: John Ciliberti, Sparta, NJ (US)

(73) Assignee: Express Scripts Strategic Development, Inc., St. Louis, MO (US)

(*) Notice: Subject to any disclaimer, the term of this patent is extended or adjusted under 35 U.S.C. 154(b) by 360 days.

(21) Appl. No.: 17/109,685

(22) Filed: Dec. 2, 2020

(51) Int. Cl.
   *G06Q 10/0832* (2023.01)
   *G06Q 10/0833* (2023.01)

(52) U.S. Cl.
   CPC ..... *G06Q 10/0832* (2013.01); *G06Q 10/0833* (2013.01); *B64U 2201/10* (2023.01)

(58) Field of Classification Search
   CPC ................ G06Q 10/0832; G06Q 10/0833
   USPC ........................................................ 705/332
   See application file for complete search history.

(56) References Cited

U.S. PATENT DOCUMENTS

| | | |
|---|---|---|
| 8,600,903 B2 | 12/2013 | Eller |
| 8,948,935 B1 | 2/2015 | Peeters |
| 9,244,147 B1 | 1/2016 | Soundararajan |
| 9,307,383 B1 | 4/2016 | Patrick |
| 9,311,820 B2 | 4/2016 | Batla |
| 9,334,052 B2 | 5/2016 | Pasko |
| 9,536,216 B1 | 1/2017 | Lisso |
| 9,542,850 B2 | 1/2017 | Kantor |
| 9,561,871 B2 | 2/2017 | Sugumaran |
| 9,569,972 B2 | 2/2017 | Pasko |
| 9,573,684 B2 | 2/2017 | Kimchi |

(Continued)

FOREIGN PATENT DOCUMENTS

| | | |
|---|---|---|
| WO | 2017213767 A2 | 12/2017 |
| WO | 2018015959 A1 | 1/2018 |

(Continued)

OTHER PUBLICATIONS

Eichleay, Margaret et al. "Using the Unmanned Aerial Vehicle Delivery Decision Tool to Consider Transporting Medical Supplies via Drone." Dec. 29, 2019. Global health, science and practice vol. 7,4 500-506. https://www.ncbi.nlm.nih.gov/pmc/articles/PMC6927828/. (Year: 2019).*

(Continued)

*Primary Examiner* — Jeff Zimmerman
*Assistant Examiner* — Hunter A Molnar
(74) *Attorney, Agent, or Firm* — Dickinson Wright PLLC

(57) ABSTRACT

A system and method for controlling an autonomous unmanned aerial vehicle for retrieval and delivery of a medical package includes determining a thermal control period for the medical package. The disclosure also includes identifying a relevant retrieval location corresponding to the medical package. The disclosure also includes identifying at least one environmental characteristic of an environment that includes a delivery three-dimensional flight path between the relevant retrieval location and a delivery location, wherein the at least one environmental characteristic indicates an actual weather value at the relevant retrieval location. The disclosure also includes determining whether to retrieve the medical package based on the thermal control period and the at least one environmental characteristic, using the unmanned aerial vehicle.

19 Claims, 16 Drawing Sheets

(56) References Cited

U.S. PATENT DOCUMENTS

| | | | |
|---|---|---|---|
| 9,583,006 | B2 | 2/2017 | Srivastava |
| 9,583,007 | B2 | 2/2017 | Ubhi |
| 9,646,283 | B2 | 5/2017 | Kantor |
| 9,747,901 | B1 | 8/2017 | Gentry |
| 9,801,517 | B2 | 10/2017 | High |
| 9,811,084 | B2 | 11/2017 | Srivastava |
| 9,818,303 | B2 | 11/2017 | Kotecha |
| 10,139,817 | B2 | 11/2018 | High |
| 10,198,708 | B2 | 2/2019 | Mattingly |
| 10,293,938 | B2 | 5/2019 | Thompson |
| 10,351,239 | B2 | 7/2019 | Di Benedetto |
| 10,486,883 | B2 | 11/2019 | Winkle |
| 10,538,327 | B2 | 1/2020 | High |
| 10,600,020 | B2 | 3/2020 | Stenneth |
| 10,614,503 | B2 | 4/2020 | High |
| 10,783,478 | B2 | 9/2020 | Studnicka |
| 10,807,714 | B2 | 10/2020 | Atchley |
| 10,874,240 | B2 | 12/2020 | Lewis |
| 10,909,492 | B1 | 2/2021 | Reinhardt |
| 11,053,021 | B2 | 7/2021 | Di Benedetto |
| 11,066,186 | B2 | 7/2021 | Walsh |
| 2004/0135031 | A1 | 7/2004 | Stupakis |
| 2010/0004802 | A1 | 1/2010 | Bodin |
| 2011/0130636 | A1 | 6/2011 | Daniel |
| 2014/0032034 | A1 | 1/2014 | Raptopoulos |
| 2016/0033966 | A1 | 2/2016 | Farris |
| 2016/0068264 | A1 | 3/2016 | Ganesh |
| 2016/0144358 | A1 | 5/2016 | Patel |
| 2016/0307449 | A1 | 10/2016 | Gordon |
| 2017/0178518 | A1 | 6/2017 | Foladare |
| 2017/0255896 | A1 | 9/2017 | Van Dyke |
| 2017/0267347 | A1* | 9/2017 | Rinaldi ................ B65D 81/18 |
| 2018/0072420 | A1* | 3/2018 | Prager ................ G06Q 10/083 |
| 2018/0130017 | A1 | 5/2018 | Gupte |
| 2018/0174099 | A1* | 6/2018 | Winkle ............. G07C 9/00896 |
| 2018/0322443 | A1* | 11/2018 | Barrington ........... G05D 1/0027 |
| 2019/0012640 | A1* | 1/2019 | Ferguson ............. B64C 39/024 |
| 2019/0061939 | A1 | 2/2019 | Anand |
| 2019/0079509 | A1 | 3/2019 | Bosworth |
| 2019/0130770 | A1* | 5/2019 | Di Benedetto ...... G08G 5/0026 |
| 2019/0197646 | A1 | 6/2019 | Prager |
| 2019/0227572 | A1 | 7/2019 | Blonder |
| 2019/0236498 | A1 | 8/2019 | Cantrell |
| 2019/0300202 | A1 | 10/2019 | High |
| 2019/0325384 | A1* | 10/2019 | Tovey ................. G06F 16/9537 |
| 2019/0340569 | A1* | 11/2019 | Prager ............. G06Q 10/06315 |
| 2020/0034646 | A1* | 1/2020 | Ding ..................... G06V 20/17 |
| 2020/0130510 | A1* | 4/2020 | Eck .................... G06Q 10/0836 |
| 2020/0231392 | A1* | 7/2020 | Singh .................... B65G 61/00 |
| 2021/0073715 | A1 | 3/2021 | Yamada |
| 2022/0019222 | A1* | 1/2022 | Raabe .................... B64D 47/08 |

FOREIGN PATENT DOCUMENTS

| | | | | |
|---|---|---|---|---|
| WO | | 2019079905 A1 | 5/2019 | |
| WO | WO-2021154875 A1 * | | 8/2021 | ............. F16B 21/02 |

OTHER PUBLICATIONS

De Leon, Zipline begins drone delivery of Covid-19 test samples in Ghana, CNBC Disruptor 50, Apr. 20, 2020.

Pixel by Labcorp, Covid-19 Test (At-Home Collection Kit), https://www.pixel.labcorp.com/at-home-test-kits/covid-19-test; accessed as early as Apr. 24, 2020.

Roblin, Will Blood-Bearing Delivery Drones Transform Disaster Relief and Battlefield Medicine?, https://www.forbes.com/sites/sebastienroblin/2019/10/22/will-blood-bearing-delivery-drones--transform-disaster-relief-and-battlefield-medicine/, Oct. 22, 2019.

* cited by examiner

SYSTEM AND METHOD FOR RECEIVING AND DELIVERING A MEDICAL PACKAGE

TECHNICAL FIELD

This disclosure relates to receiving and delivering medical packages and in particular to systems and methods for autonomously receiving and delivering a medical package.

BACKGROUND

As postal infrastructures continue to become more and more efficient, the mailing of certain medical packages has become more widely available within our healthcare system. For example, requirements for hospital visits have decreased as more and more medical testing procedures can be accomplished by harvesting biological samples at home and mailing them directly to centralized testing laboratories.

Typically, biological samples are taken at the direction of such laboratories. The directions may include multi-step procedures for harvesting and packing the biological samples such that the samples can be preserved and protected from damage during transportation. These biological samples may be delivered using a variety of delivery services, such as a postal service, a parcel delivery service, a contractor, or other service under direct control of a corresponding laboratory testing provider, and the like. Some testing procedures require biological samples that quickly degrade and cannot easily be preserved and thus require a short time period between harvesting and testing and keeping the sample in a thermally protected environment. In addition, some testing procedures correspond to dangerous and infectious diseases wherein quick results are particularly important.

SUMMARY

This disclosure relates generally to receiving and delivering a medical package.

This disclosure also relates generally to delivering the medical package to a delivery location.

An aspect of the disclosed embodiments includes a method for controlling an autonomous unmanned aerial vehicle for receiving a medical package is provided. The method includes receiving location information corresponding to a location of a medical package. The method includes providing preparation information to an individual associated with the medical package, the preparation information indicating, at least, a position at the location of the medical package to arrange a retrieval mat and the medical package. The method includes identifying a three-dimensional flight path between a starting location and the location of the medical package. The method includes traversing, using the unmanned aerial vehicle, the three-dimensional flight path. The method includes identifying, using an image-capturing device of the unmanned aerial vehicle, at least one characteristic of the retrieval mat and determining a location of the medical package on the retrieval mat using the at least one characteristic of the retrieval mat. The method includes performing a first attempt to engage a portion of the medical package using an engaging member of the unmanned aerial vehicle. In response to a determination that the first attempt to engage the portion of the medical package using the engaging member of the unmanned aerial vehicle is successful, the method includes traversing a three-dimensional flight path between the location of the medical package and a delivery location.

In accordance with another aspect, an apparatus for controlling unmanned flight retrieval of a medical package is provided. The apparatus comprises a processor and a memory that includes instructions that, when executed by the processor, cause the processor to perform a number of tasks. The processor may be caused to receive location information corresponding to a location of a medical package. The processor may be further caused to provide preparation information to an individual associated with the medical package, the preparation information indicating, at least, a position at the location of the medical package to arrange a retrieval mat and the medical package. The processor may be further caused to identify a three-dimensional flight path between a starting location and the location of the medical package. The processor may be further caused to traverse, using the unmanned aerial vehicle, the three-dimensional flight path; identify, using an image-capturing device of the unmanned aerial vehicle, at least one characteristic of the retrieval mat. The processor may be further caused to perform a first attempt to engage a portion of the medical package using an engaging member of the unmanned aerial vehicle. The processor may be further caused to, in response to a determination that the first attempt to engage the portion of the medical package using the engaging member of the unmanned aerial vehicle is unsuccessful, rotate the unmanned aerial vehicle a first predetermined number of degrees and perform a second attempt to engage a portion of the medical package using an engaging member of the unmanned aerial vehicle.

In accordance with yet another aspect, a system for retrieval and delivery of a medication package is provided. The system comprises a retrieval mat including at least one characteristic, a medical package including a payload, an unmanned aerial vehicle including an engaging member, at least one processor, and at least one memory that includes instructions that, when executed by the at least one processor, cause the at least one processor to perform a number of tasks. The processor may be caused to receive location information corresponding to a location of the medical package. The processor may be further caused to provide preparation information to an individual associated with the medical package, the preparation information indicating, at least, a position at the location of the medical package to arrange the retrieval mat and the medical package. The processor may be further caused to identify a three-dimensional flight path between a starting location and the location of the medical package. The processor may be further caused to traverse, using the unmanned aerial vehicle, the three-dimensional flight path. The processor may be further caused to identify, using an image-capturing device of the unmanned aerial vehicle, the at least one characteristic of the retrieval mat. The processor may be further caused to determine a location of the retrieval mat using the at least one characteristic of the retrieval mat. The processor may be further caused to determine a location of the medical package on the retrieval mat using the at least one characteristic of the retrieval mat. The processor may be further caused to determine an orientation of the medical package on the retrieval mat using the at least one characteristic of the retrieval mat. The processor may be further caused to, in response to a determination of the location and orientation of the medical package on the retrieval mat, position the unmanned aerial vehicle over the medical package, orient the unmanned aerial vehicle with respect to the medical package, and perform a first attempt to engage a portion of the medical package using the engaging member of the unmanned aerial vehicle. The processor may be further caused to, in response to a determination that the first attempt to engage the portion of the medical package using the engaging member of the unmanned aerial vehicle is successful, traverse a three-dimensional flight path between the location of the medical package and a delivery location.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
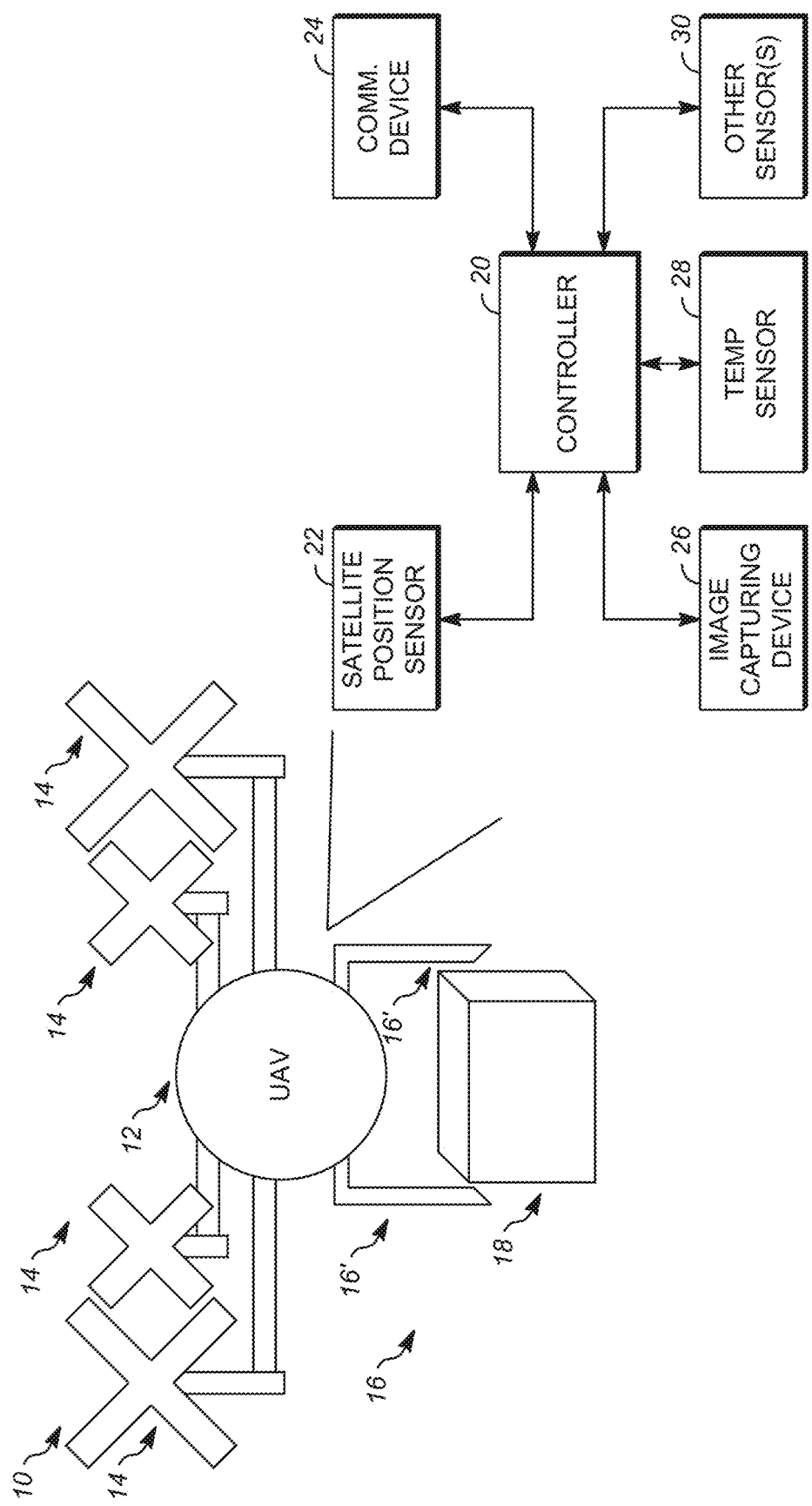
FIG. 1 generally illustrates an unmanned aerial vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, medical packages containing payloads, such as biological samples, other samples, and the like, are increasingly being harvested at home and shipped from a residence or postal location to a laboratory. These medical packages may be delivered using a variety of delivery services, such as a postal service, a parcel delivery service, a contractor, or other service under direct control of a corresponding laboratory testing provider, and the like. Such delivery services may be ground-based vehicles or aircraft.

Some medical packages, such as certain samples, may be susceptible to degradation over extended periods and exposure to thermal conditions of a delivery environment without proper care during delivery. For example, a blood alcohol tests or other tests that tend to lose accuracy over extended periods or require samples from specific time windows. Typically, laboratory providers provide a temperature-controlled package (e.g., using an insulated container and ice, gel packs, dry ice, and the like) or other chemical preservation techniques for samples or other payloads that are susceptible to damage resulting from handling, timing between harvesting and testing, extended exposure to relatively high ambient temperatures or extended exposure to relatively low ambient temperatures.

Such temperature-controlled packages are typically prepared by the laboratory testing provider at a corresponding facility and then transported or handed off to a delivery service, such as those described herein. The delivery service may then transport the temperature-controlled packages through a corresponding delivery network until the temperature-controlled packages reach respective delivery destinations.

A laboratory testing provider device may determine a proper type and amount of thermal protection for a medical package (e.g., a temperature controlled package), taking into account an amount of time, or package delivery period, that the medical package will be in a corresponding delivery network and an estimated amount of time, or an estimated retrieval period, that the medical package may remain at a location for retrieval (e.g., before the medical package enters the delivery network but after it is placed in a location for retrieval).

However, due to variations in the delivery network, traffic along a delivery route, weather conditions, and the like, retrieval and delivery of the medical package may be delayed, which may cause the sample or other payloads in the medical package to be exposed to increased or decreased temperatures, which may adversely affect the efficacy of the testing accuracy as a result of sample degradation, as described.

Accordingly, systems and methods, such as those described herein, that are configured to provide improved retrieval and thermal control of medical packages, may be desirable. In some embodiments, the systems and methods described herein may be configured to determine an individual associated with the medical package. In some embodiments, the individual associated with the medical package may include a person from which a sample is harvested, a caretaker of a person from which a sample is harvested, a medical service provider, or other persons permitted to assist in the packaging and placement for retrieval of the medical package. In some embodiments, the medical package may include a payload, such as a sample. The sample may include a biological sample. In some embodiments, the payload may be vulnerable to degradation over a period of exposure to certain elements. Unless specifically stated, the term payload is meant to include one or more of a sample, a biological sample, a payload vulnerable to degradation, a payload not vulnerable to degradation, and other suitable contents.

In some embodiments, the systems and methods described herein may be configured to determine a relevant retrieval location, which may include one or more of a retrieval region, a location of the medical package, and a designated retrieval position. In some embodiments, the retrieval region may include one or more of an address, GPS coordinates, spatial boundaries associated with the individual associated with the medical package, a caretaker address, a medical campus, or other spatial boundaries. In some embodiments, the location of the medical package may include the actual location of the medical package. In some embodiments, the designated retrieval position may include a preselected location (e.g., scheduled, recommended, or optimal location) to place the medical package such as a porch, yard, or other location within the retrieval region.

In some embodiments, the designated retrieval position may include a preselected orientation to place the medical package. Thus, the location of the medical package and the designated retrieval position may both be somewhere within the retrieval region at the same location when the individual associated with the medical package places the medical package at the preselected designated retrieval position. In addition, the location of the medical package and the designated retrieval position may both be somewhere within the retrieval region but at different locations when the individual associated with the medical package places the medical package somewhere other than the preselected designated retrieval position. In addition, the location of the medical package may be outside of the retrieval region. Unless specifically stated, the term relevant retrieval location is meant to include one or more of the retrieval regions, the location of the medical package, and the designated retrieval position.

The systems and methods described herein may be configured to determine a thermal control period for the medical package. The systems and methods described herein may be configured to identify at least one environmental characteristic of an environment that includes a delivery route between the relevant retrieval location and a delivery location. The systems and methods described herein may be configured to determine whether to retrieve the medical package from the relevant retrieval location based on the thermal control period and the at least one environmental characteristic. The systems and methods described herein may also determine the length of time a medical package may remain at the relevant retrieval location before the thermal budget of the payload inside of the medical package is exceeded.

In some embodiments, the thermal control period corresponds to a period that a payload of the medical package may safely remain in the medical package. In some embodiments, the at least one environmental characteristic includes a thermal profile of the relevant retrieval location. The thermal profile may vary based on environmental conditions at the relevant retrieval location, which may be measured using the at least one environmental characteristic. In some embodiments, the at least one environmental characteristic includes a maximum predicted wind velocity along the delivery route. In some embodiments, the at least one environmental characteristic includes an average predicted wind velocity along the delivery route. In some embodiments, the at least one environmental characteristic includes an average predicted thermal exposure of the medical package along the delivery route. In some embodiments, the at least one environmental characteristic includes an average predicted thermal exposure of the medical package during a period the medical package is located outside of a thermally controlled environment before it is retrieved and delivered along the delivery route.

In some embodiments, the systems and methods described herein may be configured to identify at least one characteristic of an individual associated with the medical package, such as an availability schedule, corresponding to the at least one individual associated with the medical package. The systems and methods described herein may be configured to, determine whether to retrieve the medical package based on the thermal control period, the at least one environmental characteristic, the at least one individual associated with the medical package characteristic, or a combination thereof. The systems and methods described herein may be configured to, in response to a determination to retrieve the medical package, retrieve the medical package from the relevant retrieval location using an unmanned aerial vehicle.

In some embodiments, the systems and methods described herein may be configured to provide preparation information to an individual associated with the medical package, the preparation information indicating, at least, a position to arrange a retrieval mat and the medical package.

In some embodiments, the systems and methods described herein may be configured to determine a thermal control period for the medical package. The systems and methods described herein may be configured to determine whether to retrieve the medical package based on the thermal control period and at least one environmental characteristic corresponding to a delivery route between a relevant retrieval location and a delivery location. The delivery route may include a round trip path from a starting location to the relevant retrieval location and then to the delivery destination, the starting location may be the same or different from the delivery destination. In some embodiments, the delivery route may include three-dimensional features of varying altitudes of the travel path and locations to avoid such as major population hubs, power towers, etc. In some embodiments, the delivery route may include the path between the relevant retrieval location to the delivery location. The systems and methods described herein may be configured to, in response to a determination to retrieve the medical package, selectively instruct an unmanned aerial vehicle to travel to and retrieve the medical package from the relevant retrieval location and to transport the medical package from the relevant retrieval location to the delivery location, where after it may be prepared for shipment to an end destination such as the laboratory service provider.

In some embodiments, the unmanned aerial vehicle may be selectively instructed to deliver the medical package from the relevant retrieval location to the delivery location, which may be the end destination such as the laboratory testing facility. The systems and methods described herein may be configured to receive a notification that the unmanned aerial vehicle has arrived at the relevant retrieval location and provide a notification to an individual associated with the medical package that the unmanned aerial vehicle is ready to receive the medical package. The systems and methods described herein may be configured to determine, in response to receiving the notification from an individual associated with the medical package, whether an individual associated with the medical package of the medical package has prepared the medical package for retrieval. The systems and methods described herein may be configured to receive a notification from the unmanned aerial vehicle indicating that the unmanned aerial vehicle successfully retrieved the medical package at the relevant retrieval location. The systems and methods described herein may be configured to receive a notification from the unmanned aerial vehicle indicating that the unmanned aerial vehicle delivered the medical package at the delivery destination after a successful retrieval.

In some embodiments, the systems and methods described herein may be configured to, in response to a determination that the individual associated with the medical package of the medical package has not prepared the medical package for retrieval or has improperly prepared the medical package for retrieval, calculate a difference between the thermal control period and a package delivery period caused by the delay. The package delivery period may correspond to a starting period for example, when the payload was obtained, when the payload was placed within the medical package, when the medical package was been placed outside, when the medical package is retrieved by the unmanned aerial vehicle, or when the medical package was removed from a thermally controlled environment. The package delivery period may also correspond to an ending period, for example, when the medical packages is delivered it to the delivery location, which may be thermally controlled. In one embodiment, the package delivery period may correspond to a period between when the individual associated with the medical package communicates that the medical package has left a thermally controlled environment such as a refrigerator or freezer and the time it takes the unmanned aerial vehicle to retrieve the medical package and deliver it to a delivery location.

In some embodiments, the systems and methods described herein may be configured to, in response to a determination that the difference between the thermal control period and the package delivery period is less than a threshold, selectively instruct one of the unmanned aerial vehicles or one of a plurality of other unmanned aerial vehicles to retrieve the medical package from the relevant retrieval location. The unmanned aerial vehicle and the plurality of other unmanned aerial vehicles may include autonomous unmanned aerial vehicles.

In some embodiments, the systems and methods described herein may be configured to, in response to a determination that the difference between the thermal control period and the package delivery period is greater than a threshold, communicate to the individual associated with the medical package to either deposit the medical package back in a thermally controlled environment or to harvest an additional payload and restart the scheduling process.

In some embodiments, the systems and methods described herein may include a mat at the relevant retrieval location, such as the location of the medical package. The mat may include at least one identifier that can be identified by the unmanned aerial vehicle as it approaches the relevant retrieval location. In some embodiments, the at least one identifier may include a placement identifier for guiding the individual associated with the medical package on which location and orientation on the mat to place the medical package. In some embodiments, the mat may include a retrieval identifier for guiding the unmanned aerial vehicle to an ideal orientation before it lowers into receiving contact with the medical package. In some embodiments, the at least one identifier identifies the location of the mat. In some embodiments, the mat may include a thermal pack located adjacent to the placement identifier for providing additional thermal regulation between placement and retrieval of the medical package.

In some embodiments, the thermal control period may include determining a temperature of the thermal pack or other thermal earmark during the time of retrieval. For example, the thermal pack or the thermal earmark may include a body of gel, liquid, or solid material that is pre-cooled (e.g., frozen) or heated (e.g., to a specific temperature) that changes temperature as a result to exposure to the ambient environment at the location for retrieval. A thermal characteristic of the thermal pack and the thermal earmark may be used as a reference for determining the status of the medical package in order to calculate the thermal control period and associated threshold values. The thermal control pack or thermal earmark may also be located on or within the medical package. The thermal earmark may include a digital counter that tracks a change from a pre-cooled or pre-heated temperature to the temperature during retrieval of the medical package. Changes of the temperature may be received and used to extrapolate or hypothesize a remaining thermal budget ("thermal control period") of the medical package 18 based on a predefined proportional relationship between the cooling or heating rates of the thermal earmark and the medical package 18 when exposed to ambient temperatures and various environmental conditions.

In some embodiments, the medical package may include an internal thermometer to convey a starting temperature to the unmanned aerial vehicle or associated components and systems, which may be used as a reference for determining the status of the payload in order to calculate the thermal control period and associated threshold values. The thermometer may convey the internal temperature to the unmanned aerial vehicle or associated components and systems via wireless technology or may provide an indicator on the medical package that can be read by a sensor or vision system on the unmanned aerial vehicle.

In some embodiments, the medical package may include a period for receiving a sensor reading from the unmanned aerial vehicle for determining the status of the medical package in order to calculate the thermal control period and associated threshold values.

FIG. 1 generally illustrates an unmanned aerial vehicle (UAV) 10 according to the principles of the present disclosure. The UAV 10 may include an aerial vehicle that is unpiloted or unmanned and may be referred to as a drone. The UAV 10 may include a body 12. The body 12 may include any suitable body and comprise any suitable shape and size.

In some embodiments, the UAV 10 may include one or more rotors 14. The rotors 14 may be configured to rotate at a rate that causes the UAV 10 to lift. The rotors 14 may be selectively rotatable along a horizontal axis causing the UAV 10, in response to various rotations of selective ones of the rotors 14 about the horizontal axis, to cause the UAV 10 to travel in a forward direction, travel in a backward direction, travel in one of various sideways directions, or travel in any suitable direction. In some embodiments, the one or more of the rotors 14 may rotate along a vertical axis. It should be understood that, while the UAV 10 is illustrated to include four rotors 14, the UAV 10 may include one rotor 14, two rotors 14, three rotors 14, four rotors 14, or any suitable number of rotors 14, and other suitable rotors other than the rotors 14. Additionally, or alternatively, the rotors 14 may include any size or number of rotor blades. The rotors 14 may be designed to provide lift for the UAV 10 and any package that the UAV 10 may carry to a destination location. In some embodiments, the UAV 10 may include one or more wings to provide lift and assist the rotors 14 lift the UAV 10.

In some embodiments, the UAV 10 may include a carrier 16 disposed on the body 12. The carrier 16 may be configured to carry or hold a package, such as a medical package 18. The carrier 16 may include one or more carrier arms 16'. The carrier arms 16' may include actuatable or articulate arms in communication with one or more actuating components that cause the carrier arms 16' to extend in any suitable direction and to retract toward the medical package 18, such that the carrier arms 16' securely grip and hold the medical package 18. The articulating components may include a stepper motor and a linkage (e.g. or other suitable components) configured to cause the carrier arms 16' to move from an open position to a closed position, to release a package or grip a package respectively.

It should be understood that the carrier 16 and carrier arms 16' may include any suitable carrier and carrier arms and may be configured to securely grip or hold the medical package 18 in any suitable manner other than those described herein. Additionally, or alternatively, the UAV 10 may include the carrier 16 and a basket, a net, a closable compartment (e.g., including a lockable compartment), or any suitable mechanism for securely gripping, holding, and carrying the medical package 18. As will be described, the carrier arms 16' may include one or more engaging members. The one or more engaging members may include articulating hooks, claws, fingers, other suitable engaging members, or a combination thereof. The engaging members may be configured to engage a portion of the medical package 18 such as a strap that may be located on the medical package 18 so that the UAV 10 can pick up the medical package 18 during retrieval.

In some embodiments, the body 12 may be configured to house or enclose a controller 20 configured to control operations of the UAV 10. The controller 20 may include a processor and a memory. The processor may include any suitable processor, such as those described herein. The memory may include Random Access Memory (RAM), a Read-Only Memory (ROM), or a combination thereof. The memory may store programs, utilities, or processes to be executed in by the processor. The memory may provide volatile data storage, and stores instructions related to the operation of the UAV 10. For example, the memory may store UAV specific instructions for execution by the processor and data related to the medical package 18, the other UAVs 10', the environmental characteristics (e.g., or the route, the destination location, and other environmental characteristics), other suitable data, or a combination thereof.

Figure 3A:
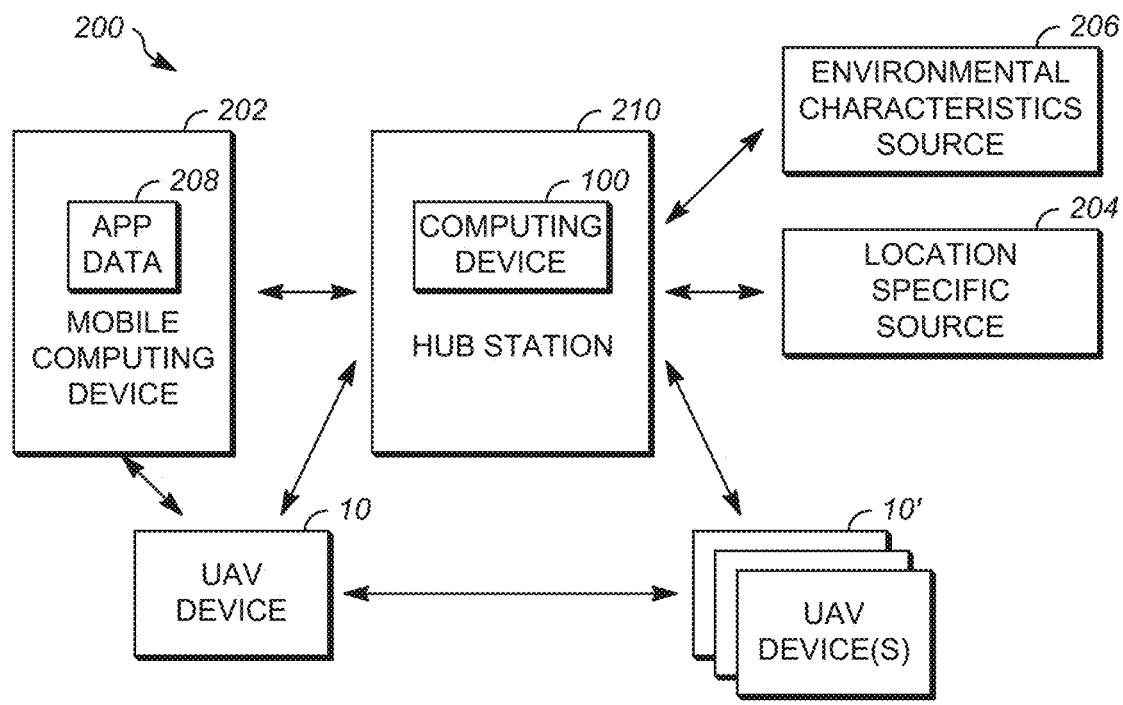
FIG. 3A generally illustrates a block diagram of a medical package receiving and delivery system according to the principles of the present disclosure.
Figure 3B:
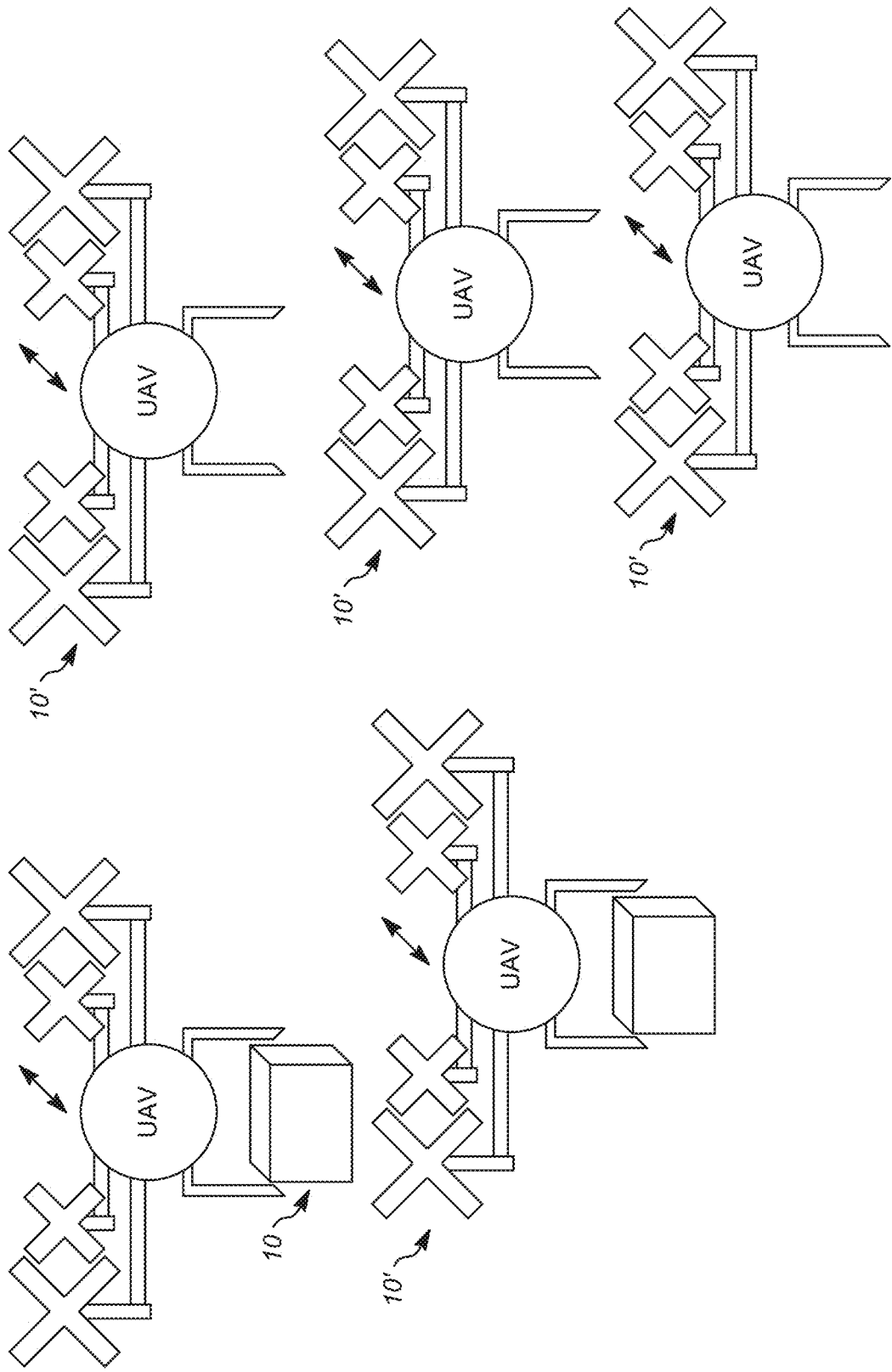
FIG. 3B generally illustrates an unmanned aerial vehicle communications network according to the principles of the present disclosure.

The UAV 10 may include various sensors or data capturing devices. For example, the UAV 10 may include a satellite positioning (e.g., a global positioning system (GPS) sensor) 22 configured to provide global positioning data. The satellite navigation receive may also operate to determine a UAV location using a global navigation satellite system (GLONASS), BeiDue navigation system, Galileo navigation system, and the like. The controller 20 may use the global position data received from the satellite-positioning sensor 22 to operate the UAV 10 along a delivery route for the medical package, or any suitable path. The path may be calculated based on information indicating characteristics of the physical terrain and various manmade structures. The UAV 10 may include a communication device 24 configured to communicate with, as is generally illustrated in FIGS. 3A and 3B, other UAVs, such as the other UAVs 10', one or more mobile computing devices, such as the mobile computing device 202, data sources, such as a location specific data source 204 and an environmental characteristics data source 206, a hub station, such as the hub station 210, other suitable devices or mechanism, or a combination thereof.

The communication device 24 may include any suitable communication device, such as a WiFi transmitter and receiver, a Bluetooth device, a long-range communication device, a short-range communication device, a radio device, a 4G device, a 5G device, any other suitable communication device, or a combination thereof. The communication device 24 may provide communication between the UAV 10 and a hub, a base station, or other UAVs.

The UAV 10 may include an image-capturing device 26 ("vision system") and other suitable data capturing devices. The image-capturing device 26 may include a solid-state image device (e.g. a charge-coupled device (CCD), or another suitable solid-state image capturing device), or other suitable image-capturing device. The image-capturing device 26 may include or be one of a plurality of image-capturing devices. The image-capturing device 26 may be configured to capture image data corresponding to an environment external to the UAV 10 (e.g., within a visible range of the image-capturing device 26). The controller 20 may be configured to analyze the image data and selectively control the UAV 10 based on the image data. In some embodiments, the controller 20 may communicate the image data to the hub station 210. The hub station 210 may analyze the image data and communicate instructions for controlling the UAV 10 to the controller 20. The controller 20 may control the UAV 10 based on the instructions. The controller 20, via the image capturing device 26, may be configured to recognize and identify the specific color spectrums or contrasts and also specific designs and sheens and instruct the UAV 10 to perform certain operations in response. The image capturing device 26 may include one or more cameras that capture video and images and communicate them real-time within system 200 that will be described in greater detail below.

The UAV 10 may include a temperature sensor 28. The temperature sensor 28 may be configured to sense or measure one or more temperature measurements of the environment external to the UAV 10, such as ambient temperature, the temperature of the thermal pack, the temperature of the thermal earmark, and the temperature within the medical package which may be received through the window. The controller 20 may selectively control operations of the UAV 10 based on the one or more temperature measurements. For example, the ambient temperature and at least one other temperature. In some embodiments, the controller 20 may communicate the one or more temperature measurements to the hub station 210. The hub station 210 may analyze the one or more temperature measurements and may provide instructions to the controller 20 for controlling the UAV 10 based on the one or more temperature measurements. The controller 20 may selectively control operations of the UAV 10 and other UAVs 10' based on the instructions. The UAV 10 may include other sensors 30. The other sensors 30 may include any suitable sensors include gyroscope sensors, vibration sensors, motion sensors, moisture sensors, light sensors, infrared sensors, radar sensors, LIDAR sensors, sonar sensors, altitude sensors, wind sensors, RFID reader device, any other suitable sensors, or a combination thereof. For example, the gyroscope sensors may determine an orientation of the UAV during travel and retrieval. The motion, infrared, radar, LIDAR, and sonar sensors may assist with object detection and collision avoidance. The RFID reader device may be configured to read RFID or similar tags on the medical package 18, a mat 50, or a drop-off location to determine that the correct medical package 18 is retrieved and delivered with the designated UAV and at scheduled locations. The vibration sensor may be utilized to determine environmental conditions, e.g., those that result in turbulence, or indicate a mechanical problem within the UAV. Altitude sensors may be utilized for travel instructions along the three-dimensional flight paths, collision avoidance with other UAVs traveling along a similar path, and assisting retrieval by locating the UAV at optimum altitudes from the medical package. The moisture sensors, light sensors, and wind sensors may be utilized to determine environmental conditions that may impact a thermal budget of the medical package 18 or a power budget of the UAV. For example, readings from a wind sensor may be used to determine a reduced thermal budget resulting from wind-chill and a reduce power budget resulting from crosswinds along the three-dimensional flight path. Readings from a moisture sensor may indicate a moisture content such as humidity or the presence of rain, both of which can have effects on thermal and power budgets. The light sensors may be utilized to determine if a medical package is located in a shaded region of exposed to sunlight. Information from the sensors may be extrapolated to generate or a modify a thermal budget and a power budget.

Figure 2:
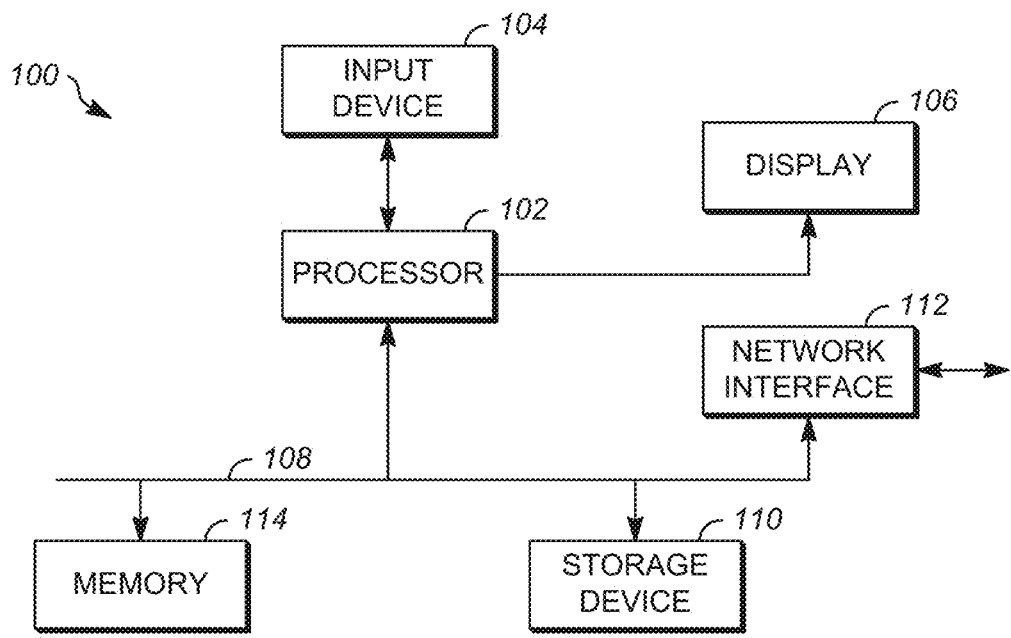
FIG. 2 generally illustrates a computing device according to the principles of the present disclosure.

FIG. 2 generally illustrates a computing device 100 according to the principle of the present disclosure. The computing device 100 may be configured to control operation of the UAV 10 and other UAVs 10'. As is generally illustrated in FIG. 3A, the hub station 210 may include the computing device 100 or any other suitable computing device. The computing device 100 may be any suitable computing device.

The computing device 100 may include a processor 102 configured to control the overall operation of computing device 100. The processor 102 may include any suitable processor, such as those described herein. The computing device 100 may also include a user input device 104 that is configured to receive input from a user of the computing device 100 and to communicate signals representing the input received from the user to the processor 102. For example, the user input device 104 may include a button, keypad, dial, touch screen, audio input interface, visual/ image capture input interface, UAV movement override input (ground control), input in the form of sensor data, etc.

The computing device 100 may include a display 106 that may be controlled by the processor 102 to display information to the user. A data bus 108 may be configured to facilitate data transfer between, at least, a storage device 110 and the processor 102. The computing device 100 may also include a network interface 112 configured to couple or connect the computing device 100 to various other computing devices or network devices via a network connection, such as a wired or wireless connection. In some embodiments, the network interface 112 includes a wireless transceiver.

The storage device 110 may comprise a single disk or a plurality of disks (e.g., hard drives), one or more solid-state drives, one or more hybrid hard drives, and the like. The storage device 110 may include a storage management module that manages one or more partitions within the storage device 110. In some embodiments, storage device 110 may include flash memory, semiconductor (solid state) memory or the like. The computing device 100 may also include a memory 114. The memory 114 may include Random Access Memory (RAM), a Read-Only Memory (ROM), or a combination thereof. The memory 114 may store programs, utilities, or processes to be executed in by the processor 102. The memory 114 may provide volatile data storage, and stores instructions related to the operation of the computing device 100.

In some embodiments, the processor 102 may be configured to execute instructions stored on the memory 114 to, at least, control operations of the UAV 10, the other UAVs 10', retrieval and delivery of the medical package 18, any other suitable operations, or a combination thereof. The processor 102 may be configured to display, on the display 106, various UAV control information, various data corresponding to the medical package 18, other suitable information, or a combination thereof. In some embodiments, the computing device 100 may omit the display 106.

FIG. 3A generally illustrates a block diagram of a medical package retrieval and delivery system 200, including the UAV 10, the other UAVs 10', and the hub station 210. The UAV 10 may be controlled by a human or robotic pilot via a ground controller and may be referred to as a drone when being controlled by a pilot via a ground controller. In some embodiments, the UAV 10 may be semi-autonomous or fully autonomous. In some embodiments, the computing device 100 of the hub station 210 may provide instructions to the UAV 10 to deliver the medical package 18, retrieve the medical package 18, other suitable instructions, or a combination thereof. The UAV 10 may autonomously carry out the instructions. For example, the computing device 100 may instruct the UAV 10 to retrieve the medical package 18 and transport the medical package 18 to a delivery location and the UAV 10 may autonomously determine a flight path to the delivery destination and autonomously determine or execute various other operations. In some embodiments, the hub station 210 may be housed or located at a pharmacy, at a distribution center, at a delivery center, on a vehicle (e.g., a mobile distribution center), a laboratory, and the like.

In some embodiments, the hub station 210 may identify the UAV 10 and one of the other UAVs 10' for retrieval and delivery of the medical package 18 based on one or more characteristics of the UAV 10 and the UAVs 10'. The one or more characteristics may include a flight distance capability (e.g., based on battery charge or other suitable flight distance capabilities), a carrying capacity, a current location of the UAV 10 and the UAV 10's to the relevant retrieval location, other suitable characteristics, or a combination thereof. For example, the hub station 210 may determine a total travel distance for the UAV 10 to retrieve and deliver the medical package 18 starting from a current location of the UAV 10 to the relevant retrieval location and from the relevant retrieval location to the delivery location. The delivery location may include battery charging or replacement capabilities.

In some embodiments, the total travel time may include travel from the delivery location to an end destination that is different from the deliver location. The deliver location and the end destination may be located at or near the hub station 210 and include battery charging or replacement capabilities. The hub station 210 may determine whether the battery of the UAV 10 includes enough charge to traverse the total travel distance accounting for travel portions in which the UAV 10 is carrying the medical package 18 (e.g., taking into account the UAV 10 carrying the medical package 18 and any potential drain on the battery do to the weight, size, shape, and other characteristics of the medical package 18). The total travel time may include using a modifier for stages in which the UAV 10 travels without the medical package and the total travel time in which the UAV 10 travels with the medical package, wherein the travel time with the package includes a modifier to increase the rate at which the battery is drained. Other factors may be considered including wind speed and direction, temperature, weather conditions, and other factors. Information about wind speed and direction, temperature, weather conditions, and other factors may be obtained from information communicated from other UAV 10' and or other sources including third-party data. This data can also be sensed by sensors on UAVs that have flown a similar flight path and its sensors can sense environmental conditions and report the sensed data to a server or to a UAV that will fly a similar flight path. In an example embodiment, the UAVs may fly a same flight path between a collection location and a destination. In a further example, when determining if there is sufficient power budget once the UAV 10 has reached the relevant retrieval location, the system may look into the amount of depleted power budget during travel without the medical package 18 and modify it by the distance to the delivery destination and the modifier which accounts for increase weight and wind drag. In some embodiments, the systems and methods may be configured to determine a power budget of the unmanned aerial vehicle and provide preparation information to the individual associated with the medical package that indicates a period for retrieval of the medical package, wherein the period corresponds to the power budget.

In some embodiments, the medical package 18 may be initially packed at a pharmacy, distribution center, laboratory, or other suitable location. As described, the medical package 18 may include a temperature-controlled package including insulation, ice, gel packs, dry ice, any other suitable thermal control mechanism, or a combination thereof. For example, medical testing components (e.g., which may include one or more related tests or components) in the medical package 18 may utilize a thermal packaging determination system configured to determine thermal control requirements of the sample which is to be placed in the medical package 18. The thermal packaging determination system may indicate to the technician suitable amounts of thermal packaging for the medical package 18. The technician may selectively include insulation, ice, gel packs, dry ice, other suitable thermal control mechanisms, or a combination thereof based on the indication from the thermal packaging determination system that may be used to control temperature of the testing components in the medical package 18 for a period and samples once they have been harvested. In some embodiments, an automated system may be configured to autonomously include a medical package that includes insulation, ice, gel packs, dry ice, other suitable thermal control mechanisms, or a combination thereof to the individual associated with the medical package based on the indication from the thermal packaging determination system. The thermal packaging determination system may provide instructions to the individual associated with the medical package to cool or heat the medical package, thermal control mechanisms, and the payload to a specific temperature or range of temperatures based on the payload, for example, the sample to be harvested or otherwise obtained.

The period, which may be referred to as a thermal control period or a thermal budget, may correspond to a period that the temperature of the payload in the medical package 18 is controlled according to the thermal control requirements given various environmental characteristics associated with the retrieval, transportation, and delivery of the medical package 18. For example, the thermal packaging determination system may increase or decrease various amounts of required insulation, ice, gel packs, dry ice, and other thermal control mechanisms in response to an average climate (e.g., controlled climate, such as on a delivery vehicle, and natural climate) acting on the medical package 18 during transportation and delivery of the medical package 18.

In some embodiments, the hub station 210 (e.g., via the computing device 100) may selectively control retrieval and delivery of the medical package 18 (e.g., and other suitable packages) using the UAV 10 and the other UAVs 10'. The UAV 10 and the other UAVs 10' may communicate directly with the computing device 100. Additionally, or alternatively, the UAV 10 and the UAVs 10' may communicate directly with one another using a communications network, such as a mesh network or other suitable network, as is generally illustrated in FIG. 3B.

The computing device 100 may receive instructions indicating that the medical package 18 is ready for retrieval. The computing device 100 may receive the instructions from a mobile device 202 of an individual associated with the medical package or any suitable source. In some embodiments, the mobile device 202 of the individual associated with the medical package may be a personal computer, tablet, cell phone, or the like. In some embodiments, the individual associated with the medical package may communicate to the hub station 210 via telephone to an automated system or persons and the hub station 210 may in turn communicate retrieval instructions to the UAV 10 or UAVs 10'.

The instructions may indicate a relevant retrieval location. The medical package 18 may be transported to the hub station 210, or the delivery location. In some embodiments, the hub station 210 may be located at the pharmacy, laboratory, or other suitable location where the contents of the medical package 18 will be tested and otherwise evaluated. The computing device 100 may determine, as will be described, whether to retrieve and deliver the medical package 18 to the delivery location based on various environmental and other information.

In some embodiments, the computing device 100 may determine a thermal control period for the medical package 18. For example, the computing device 100 may include instructions indicating the retrieval and delivery destination of the medical package 18. Additionally, or alternatively, the instructions may include an initial thermal control period. The computing device 100 may determine a current time and selectively adjust the initial thermal control period based on the current time (e.g., the computing device 100 may reduce the initial thermal control period by an amount of time that has passed since the medical package 18 was packed by the individual associated with the medical package, an amount of time that was passed since the medical package 18 was removed from a thermally controlled environment, or other scenarios). Additionally, or alternatively, the computing device 100 may selectively adjust the initial thermal control period based on any suitable information such as current temperature readings of the medical package, the thermal packet, the thermal earmark, or changes to ambient conditions or projected ambient conditions.

In some embodiments, the computing device 100 may identify one or more environmental characteristics of an environment that includes a retrieval and delivery route between the hub station 210 (e.g., a starting location), the relevant retrieval location, and the delivery destination. The hub station 210 may be in the same location as the deliver location and end destination. For example, the hub station 210 may receive, from one or more environmental characteristic data sources 206, environmental information for the delivery route. The environmental characteristic data sources 206 may include a weather station, a remotely located computing device (e.g., such as a cloud computing server or other suitable remotely located computing device), a database that includes historical environmental information, a database that includes estimated or predicted environmental information, other UAVs 10' that have recently traveled proximate to the delivery route, any other suitable source, or a combination thereof.

In some embodiments, the environmental information may include an estimated temperature or temperatures for the delivery path during an estimated retrieval and delivery period, an estimated average temperature for the delivery route during the estimated retrieval and delivery period, an estimated amount of sun exposure for the delivery path during the estimated retrieval and delivery period, any other suitable information, or a combination thereof.

In some embodiments, the environmental information may include an estimated wind velocity or wind velocities for the delivery path during the estimated retrieval and delivery period, a maximum wind velocity for the delivery path during the estimated retrieval and delivery period, an average wind velocity for the delivery path during the estimated retrieval and delivery period, other suitable environmental information, or a combination thereof.

In some embodiments, the environmental information may include an amount of precipitation currently measured, sensed, or determined along the flight path, at the relevant retrieval location, and at the delivery location, an estimated amount of precipitation expected to be experienced by the UAV 10 along the flight path, at the relevant retrieval location, and at the delivery location, other suitable environmental information, or a combination thereof.

In some embodiments, the computing device 100 may receive various environmental measurements from the UAV 10 and the UAVs 10' while the UAV 10 and the UAVs 10' transport other medical packages from various location of the other medical packages along various delivery routes that are proximately located to or include at least part of the delivery path of the medical package 18. For example, a first UAV 10' may measure a current temperature and a current wind velocity of a delivery route being traversed by the first UAV 10' and communicate the current temperature and current wind velocity to the computing device 100. Additionally, or alternatively, a second UAV 10' may measure an amount of sun exposure experienced by the second UAV 10' while the traverses another delivery route being traversed by the second UAV 10' and may communicate the amount of sun exposure to the computing device 100. Environmental data from one or multiple UAVs 10' and other sources may be averaged or otherwise aggregated into a profile corresponding to a flight path. Alternatively, the environmental data may be segmented into a profile that includes discrete portions along two or three dimensions of the travel path that have variances of one or more environmental factor.

The second UAV 10' may measure the amount of shade along the delivery route or one or more portions of the delivery route. Additionally, or alternatively, some UAVs 10' and the UAV 10 may travel along a portion of a route (e.g., such as a portion of the delivery route) that may be traversed by a subsequent UAV 10' and the UAV 10. The measured sun exposure data, the measured shade data, and other measured environmental data from the UAVs 10' and the UAV 10 may be used to determine the thermal impact on a medical package being carried by the UAV 10 and other UAVs 10'. The computing device 100 may use the received measurements to estimate the environmental characteristics of the delivery route for the medical package 18.

It should be understood that the computing device 100 may receive a plurality of measurements from a plurality of UAVs over various periods for various delivery routes. The computing device 100 may analyze the plurality of measurements and may estimate various environmental characteristics of the retrieval and delivery route for the medical package 18. Additionally, or alternatively, the computing device 100 may estimate the environmental characteristics of the retrieval and delivery route for the medical package 18 using the received measurements, the received environmental information, any other suitable information, or a combination thereof. The time of day may also be considered, wherein early morning and late afternoon may be highly preferable for medical packages 18, which are better preserved in colder temperatures.

In some embodiments, the computing device 100 may identify one or more location specific characteristics corresponding to the delivery route. For example, the hub station 210 may receive, from one or more location specific data sources 204, location specific characteristics of the relevant retrieval location and the delivery location. The location specific data sources 204 may include one or more sensors disposed at the relevant retrieval location and delivery destination, other suitable sources, or a combination thereof. The location specific characteristics may include various environmental characteristics of the delivery destination and the relevant retrieval location.

The one or more mobile computing devices may include an application that access one or more sensors associated with respective mobile computing devices. The application may receive temperature measurements, wind velocity measurements, other suitable measurements, or a combination thereof from the one or more sensors. The application, for each respective mobile computing device, may communicate the measurements to the computing device 100 or to a central repository that the computing device 100 accesses to retrieve the measurements. The computing device 100 may estimate environmental characteristics of the relevant retrieval location or the delivery destination of the medical package 18 using the measurements. In some embodiments, the mobile computing device may be located at or near the relevant retrieval location and the location of the mobile computing device may be used in conjunction with other data source 206 or nearby UAV 10 readings for determining the at least one environmental factor.

In some embodiments, the computing device 100 may receive various location specific information from the UAV 10 and the UAVs 10' while the UAV 10 and the UAVs 10' retrieve other medical packages and deliver them to the delivery locations or destinations (e.g., during previous retrieval and delivery of other medical packages). For example, the first UAV 10' may capture one or more images of the relevant retrieval location and delivery destination. The one or more images may include images of the designated retrieval position and the position of the medical package.

The computing device 100 may receive the one or more images and generate a thermal exposure profile for the relevant retrieval location. For example, the computing device 100 may extrapolate or estimate, based on sun light exposure to the relevant retrieval location, in the one or more images, an amount of sun light exposure at the relevant retrieval location for various times of day during various days of the year. The computing device 100 may output a sunlight exposure value. The computing device 100 may use the sun light exposure value corresponding to the relevant retrieval location to estimate an amount of increased (e.g., due to sun exposure) or decreased (e.g., due to an amount of shade at the relevant retrieval location) thermal exposure experienced by the medical package 18 before retrieval. The retrieval period may correspond to a period between a time the medical package 18 is estimated to at the relevant retrieval location (or removed from a thermally controlled environment) before retrieval.

It should be understood that the one or more images may include any suitable information and the computing device 100 may generate any suitable thermal profile for any suitable location within or outside of the relevant retrieval location. The computing device 100 may generate the thermal profiles for the relevant retrieval location using the images of the other various locations of other medical packages, regions surrounding the relevant retrieval location, or other suitable locations. Additionally, or alternatively, the computing device 100 may receive one or more images from the UAV 10 and a plurality of the UAVs 10' that include images of potential designated retrieval positions to place the medical package 18 based on the thermal readings of the retrieval region. In some embodiments, if the medical package is not located at one of the designated retrieval positions, images of the retrieval region from the UAV 10 or a plurality of the UAVs 10' may be used to locate the location of the medical package. Moreover, images of the area within or surrounding the relevant retrieval location may be used to provide at least one designated retrieval position that may be communicated to the individual associated with the medical package before retrieval.

In some embodiments, the one or more images may include or indicate data corresponding to the day of the year and the time of day. The computing device 100 may use the data to generate an accurate module at a location along various flight paths to be used by the UAV 10 and other UAVs 10'. Additionally, or alternatively, the computing device 100 may use data corresponding to the one or more images to predict sunlight, shade, and other visible environmental characteristics for a specific location (e.g., identified using satellite navigation coordinates or other suitable information). The computing device 100 may use the data corresponding to the one or more images to determine an optimal retrieval time or location for the medical package 18 and a flight path for the UAV 10 and other UAVs 10'.

In some embodiments, the computing device 100 may identify one or more characteristics of an individual associated with the medical package corresponding to the individual associated with the medical package. For example, the computing device 100 may communicate with a mobile computing device 202. The mobile computing device 202 may correspond to or be associated with the individual associated with the medical package. The mobile computing device 202 may include any suitable mobile computing device, such as a smart phone, a tablet-computing device, laptop, and the like. The mobile computing device 202 may include various application data 208. The application data 208 include data from various applications on the mobile computing device 202. For example, the application data 208 may include calendar data, global position (e.g., satellite position data) data or other location data, other suitable data, or a combination thereof.

The computing device 100 may receive the application data 208 from the mobile computing device 202. The computing device 100 may determine or estimate a probability that the individual associated with the medical package will place the medical package 18 in the designated retrieval position during a period based on the application data 208. For example, the computing device 100 may analyze various calendar data and determine a probability, based on various events, calendar appointments tasks, and the like, that the individual associated with the medical package will be at or near the relevant retrieval location within the period.

In some embodiments, the computing device 100 may determine a current location of the mobile computing device 202 based on the satellite positioning data or other location data, and may determine a probability that the individual associated with the medical package will be at or near the relevant retrieval location during the period of retrieval. For example, the computing device 100 may send a request to the mobile computing device of the individual associated with the medical package to place the medical package 18 in the designated retrieval position. However, if the current location of the individual associated with the medical package provides a low probability that they would be ready, willing, and able to place the medical package 18 in the designated retrieval position, the computing device may automatically send a request for a later time having improved probability. Additionally, if patterns emerge or are otherwise provided, for example, the days in which the individual associated with the medical package works, the computing device 100 may send a request for a time that the individual associated with the medical package is estimated to be available to place the medical package 18 at the designated retrieval position. Availability of the individual associated with the medical package may be based at least in part on an estimated thermal budget of the medical package 18, wherein the individual associated with the medical package may need to place the medical package 18 outside at the designated retrieval position within a threshold period before pick-up. For example, the threshold period may be 4 hours, 2 hours, 1 hour, ½ hour, etc. The individual associated with the medical package may also provide a schedule to the computing device 100 that includes one or more available times for retrieval from which the computing device may select a retrieval time based on scheduling of the UAVs 10', environmental data, or other factors.

It should be understood that the computing device 100 may use any suitable data, including or in addition to, the application data 208 to estimate or determine the period and the probability that the individual associated with the medical package will place the medical package 18 in the relevant retrieval location during the period, such as the retrieval region or the designated retrieval position.

In some embodiments, the computing device 100 determines whether to schedule the medical package 18 to be placed at the relevant retrieval location and the UAV 10 to retrieve the medical package 18 from the relevant retrieval location based on the thermal control period, one or more environmental characteristics, one or more location specific characteristics, one or more characteristics of the individual associated with the medical package, or a combination thereof. For example, the computing device 100 may estimate the average temperature that the medical package 18 will experience while the UAV 10 transports the medical package 18 from the relevant retrieval location to the delivery destination during the estimated delivery period. The average temperature may increase or decrease the thermal control period of the medical package 18. For example, if the computing device 100 determines that the average temperature of the delivery route during the estimated deliver time is above a threshold, the computing device 100 may determine that the thermal control period of the medical package 18 may decrease. The computing device 100 may selectively adjust the thermal control period based on the average temperature. In addition, the computing device 100 may account for an estimated time in which the medical package 18 was located at the relevant retrieval location before pick-up and travel along the delivery route. In addition, the thermal control period may account for the current temperature readings of the medical package 18, the thermal packet, and the thermal earmark as the medical package 18 is being retrieved. In addition, the computing device 100 may account for the thermal control period when scheduling a retrieval time and location with the individual associated with the medical package 18.

The computing device 100 may estimate an average temperature and an average sun light exposure experienced by the medical package 18 before the UAV 10 deposits the medical package 18 at the deposit location. The computing device 100 may selectively adjust the thermal control period based on the average temperature and the average sun light exposure experienced by the medical package 18 before it can be deposited in the deposit location, which may be a thermally controlled location.

The computing device 100 may estimate a maximum wind velocity and an average wind velocity experienced by the UAV 10 while the UAV 10 traverses the delivery route. As wind velocity increases, the UAV 10 may experience flight resistance, which may cause a power source, such as a battery, of the UAV 10 to decrease in charge. The decrease in charge may cause the UAV 10 to reduce flight speed in order to conserve charge. Additionally, or alternatively, the flight resistance may reduce the flight speed of the UAV 10. A reduction in flight speed may increase the retrieval and delivery period. If the computing device 100 may selectively adjust the thermal control period based on the estimated maximum wind velocity and the average wind velocity. In some embodiments, the UAV 10 and other UAVs 10' may include one or more solar panels and one or more corresponding solar energy conversion mechanisms. The one or more solar panels may be configured to receive solar energy while the UAV 10 and other UAVs 10' traverse a given flight path. The one or more solar energy conversion mechanisms may be configured to convert solar energy received by one or more solar panels into power used to charge the battery or other power source of the UAV 10 and other UAVs 10'.

Budgeting of the power source may include determining the power requirements to transport the UAV 10 to the relevant retrieval location and modifying the requirements in view of the additional weight as the UAV 10 delivers the medical package 18 to the delivery location. Moreover, the budgeting of the power source may include storing a predetermined surplus of power that is more than an expected depletion that results from picking up the medical package 18 at the relevant retrieval location. For example, the surplus may allow several attempts to pick up the medical package 18 and allow the UAV 10 to stay at the relevant retrieval location for a predetermined amount of time until the individual associated with the medical package can be reached to place the medical package 18 in a designated retrieval position or other location of the medical package that UAV 10 retrieve the medical package from.

In some embodiments, the computing device 100 may determine, as described, the probability that the individual associated with the medical package 18 will place the medical package 18 at the relevant retrieval location, such as the designated retrieval position, during a designated period. The designated period may correspond to a period between a time that the individual associated with the medical package places the medical package 18 at the relevant retrieval location for retrieval and a time that the UAV 10 arrives at the relevant retrieval location to pick up the medical package 18. The computing device 100 may determine that the designated time period needs to be shorter depending on the distance between the relevant retrieval location and the delivery destination and environmental factors. If the computing device 100 determines that the probability that the individual associated with the medical package will place the medical package 18 at the relevant retrieval location for retrieval during a period of time that is more than a threshold (e.g., the medical package 18 will be at the relevant retrieval location for retrieval too long), the computing device 100 determines not to instruct the individual associated with the medical package to place the medical package 18 at the relevant retrieval location for retrieval and further instructs the UAV 10 not to pick up the medical package 18. The computing device 100 may then determine another suitable retrieval and delivery period for the UAV 10 to retrieval and deliver the medical package 18.

In some embodiments, the computing device 100 may inquire with an individual associated with the medical package if they can place the medical package 18 at the relevant retrieval location for retrieval in a given period or threshold (e.g., 2:30 PM-3:30 PM), if the individual associated with the medical package can only place the medical package outside of the threshold, the computing device 100 will check availability of UAVs 10' during the availability of the individual associated with the medical package and, if none are available, reschedule retrieval. The given period or threshold may be based in part on environmental conditions and estimated travel time between retrieval and delivery. For example, if the computing device 100 determines that the thermal budget of the medical package 18 is two hours and the estimated travel time between retrieval and delivery is one hour, then the given time period or threshold will be at least the thermal budget less the estimated retrieval and delivery time, e.g., within an hour before pick-up. Additionally, the thermal budget may account for multiple pick-up attempts and a waiting and inquiring period if the medical package 18 is not present at the designated retrieval position.

In some embodiments, if the computing device 100 determines that the probability that the individual associated with the medical package 18 will place the medical package 18 at the relevant retrieval location for retrieval within the threshold, the computing device 100 determines to instruct the UAV 10 to retrieve and deliver the medical package 18. The UAV 10 may transport the medical package 18 to the delivery location where the medical package 18 may be deposited.

During transportation of the medical package 18, the UAV 10 may measure actual temperatures, wind velocities, sun light exposure, flight speeds, other suitable measurements, or a combination thereof. The UAV 10 may communicate the measurements to proximately located UAVs 10', which may then communicate the measurements to the computing device 100. For example, the UAV 10 and other UAVs 10' may communicate via a wireless mesh network. Each of the UAV 10 and the other UAVs 10' may act as a node on the wireless mesh network. For example, each of the UAV 10 and the other UAVs 10' may include a radio transceiver configured to communicate with others of the UAV 10 and the UAVs 10'. The UAV 10 may identify one or more UAVs 10' within a range of the UAV 10. The UAV 10 may communicate, using the radio transceiver, the measurements and other information or data to the identified UAVs 10'. The identified UAVs 10' may communicate the measurements and other information or data to others of the UAVs 10' or directly to the computing device 100.

In some embodiments, the UAV 10 may communicate the measurements directly to the computing device 100. The computing device 100 may selectively adjust the thermal control period based on the measurements. The computing device 100 may then determine the probability that the UAV 10 will deliver the medical package 18 to the deposit location during an adjusted period. The adjusted period may correspond to a period between the medical package 18 is located at the relevant retrieval location for retrieval and the time it takes for the UAV 10 to retrieve and deliver the medical package 18.

In some embodiments, if the computing device 100 determines the probability that the individual associated with the medical package will place the medical package 18 at the relevant retrieval location for retrieval during the adjusted period is greater than the threshold, the computing device 100 may instruct the individual associated with the medical package to reschedule retrieval and may include recommendations to keep the medical package 18 in a thermally controlled environment until the next scheduled pick up. The computing device 100 may instruct the UAV 10 to return to the hub station 210 for later retrieval.

In some embodiments, if the computing device 100 determines that the probability that the individual associated with the medical package will place the medical package 18 at the relevant retrieval location for retrieval during the adjusted period is less than threshold, the computing device 100 may instruct the UAV 10 to continue retrieval and delivery. The computing device 100 may communicate with the UAV 10 directly or using one or more of the other UAVs 10'.

In some embodiments, when the retrieval needs to be rescheduled and the UAV 10 is instructed to return to the hub station 210, inquiries to other individuals associated with a different medical package within a power budget radius or along the travel route back to the hub station 210 may be initiated by the computing device 100. For example, the computing device 100 may communicate an opportunity for retrieval to a second individual associated with a second medical package, which the second individual associated with the second medical package may accept or decline. Alternatively, the computing device 100 may determine if the remaining power budget is sufficient and may instruct the UAV 10 to travel to a previously scheduled second relevant retrieval location and cancel the travel plans of the previously associated UAV 10' that was initially scheduled for the second retrieval location, thus utilizing the depleting power resources of UAV 10 and saving the power resources of the UAV 10' that was initially scheduled to travel to the second relevant retrieval location.

In some embodiments, the individual associated with the medical package may include more than one individual and each individual may include a mobile computing device 202. Therefore, the computing device 100 may schedule retrieval based on the schedule of the more than one individual associated with the medical package. In some embodiments, the computing device 100 may first communicate availability to first person associated with the medical package and if the first person is not available, the computing device 100 may further communicate availability to a second person associated with the medical package.

In some embodiments, the medical package 18 may include one or more sensors. The one or more sensors may be configured to measure an actual temperature within the medical package 18, an actual temperature at the relevant retrieval location, any other suitable information, or a combination thereof. The computing device 100 may receive measurements from the one or more sensors. For example, the one or more sensors may communicate directly with the computing device 100 and indirectly with the computing device 100 using the UAV 10, other UAVs 10', using local wireless networks, other suitable communication techniques or mechanisms, or a combination thereof.

The computing device 100 may selectively adjust the thermal control period of the medical package 18 based on the measurements from the one or more sensors of the medical package 18. The computing device 100 may then determine the probability that the medical package 18 travel period (e.g., the time between being placed on the relevant retrieval location for retrieval, picked up from the relevant retrieval location, and deposited) fits within the adjusted period. The adjusted period may correspond to a period between a current time and a threshold amount of time until the adjusted thermal control period (thermal budget) expires.

If the computing device 100 determines that the probability that the medical package 18 travel period during the adjusted period is greater than threshold, the computing device 100 may reschedule pick up and instruct the UAV 10 to return to the hub station 210 for later retrieval and delivery.

In some embodiments, if the computing device 100 determines that the probability that the medical package 18 travel time during the adjusted period is less than threshold, the computing device 100 may monitor the medical package 18 to determine whether the individual associated with the medical package has placed the medical package 18 at the relevant retrieval location for retrieval. For example, the one or more sensors of the medical package 18 may include satellite positioning sensors, gyroscope sensors, motion sensors, other suitable sensors, or a combination thereof. The computing device 100 may receive measurements from the one or more sensors indicating movement of the medical package 18. The movement may indicate that the medical package 18 has been placed at the relevant retrieval location for retrieval.

In some embodiments, the computing device 100 may receive, from the mobile computing device 202, an indication that the medical package 18 has been placed at the relevant retrieval location for retrieval. For example, the individual associated with the medical package may interact with an application on the mobile computing device 202 to indicate that the medical package 18 has be placed at the relevant retrieval location for retrieval, such as the designated retrieval position.

In some embodiments, if the computing device 100 determines that the medical package 18 has been placed at the relevant retrieval location for retrieval, the computing device 100 continues a scheduled pick up. In some embodiments, if the computing device 100 determines, less than threshold, that the recipient has not placed the medical package 18 at the relevant retrieval location for retrieval, the computing device 100 may instruct the UAV 10 or one of the other UAVs 10' to return to the hub station 210 and rescheduling retrieval.

It should be understood that the computing device 100 may receive, monitor, or analyze any suitable data instead of or in addition to the data or measurements described herein and may determine whether to retrieve and deliver the medical package 18 using any suitable data instead of or in addition to the data or measurements described herein. Additionally, or alternatively, the computing device 100 may determine whether to retrieve and deliver the medical package 18 using any suitable technique in addition to or other than those described herein.

Figure 3C:
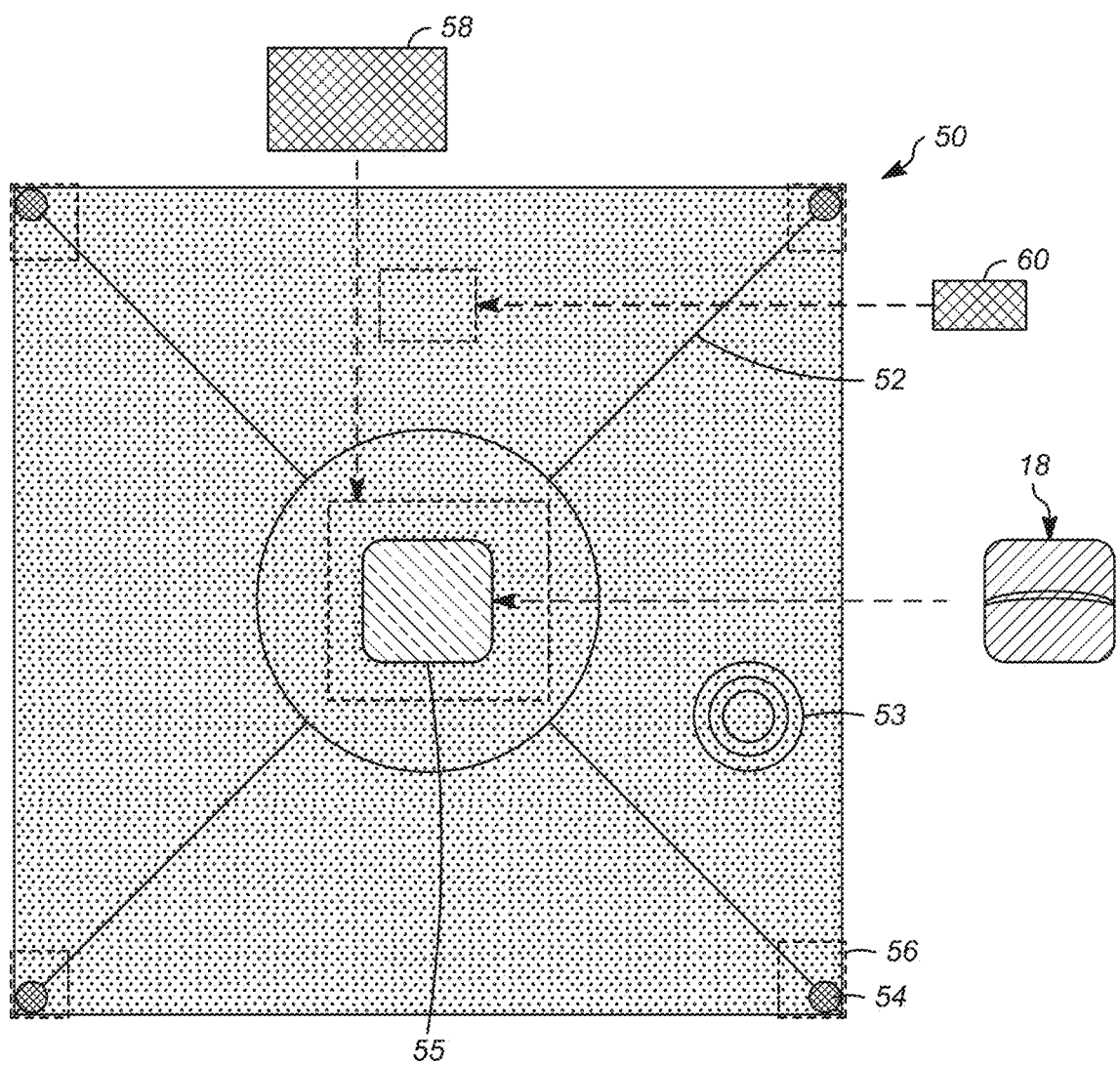
FIG. 3C generally illustrates a medical package retrieval mat according to the principles of the present disclosure.

As illustrated in FIG. 3C, a mat 50 may be used to indicate the location of the medical package 18 to the UAV 10. In some embodiments, the mat 50 may include at least one indicator that indicates at least one of a location of the retrieval mat 50 or an orientation of the medical package 18 on the retrieval mat 50. For example, the computing device 100 may include instructions to recognize the least one indicator of the mat 50, which may include a specific color spectrum or shape. In some embodiments, the mat 50 may be orange, yellow, red, pink, or any other colors or combination of colors not typically found naturally in regions associated with the relevant retrieval location. In some embodiments, the mat 50 may be circular, triangular, square, star, rectangular, hexagonal, or any other shape. In some embodiments, the mat 50 may include a recognizable reflective sheen, matte sheen, or anything in-between. In some embodiments, at least one indicator may include a surface pattern 52. The surface pattern 52 may indicate a location and an orientation of medical package 18. In an example embodiment, the surface pattern 52 can be similar to a machine-readable code, e.g., bar code, 3-D code, that indicates the orientation of the mat. In some embodiments, information about the contents of the medical package 18 or persons associated with the medical package 18 may be extrapolated from the machine-readable code. For example, the image-capturing device of the UAV 10 may capture an image of the surface pattern 52 and the computing device 100 may identify a location and an orientation of the medical package 18 based on the image. In some embodiments, the surface pattern 52 may include altitude indicia 53, from which the vision system of the UAV 10 can extrapolate the altitude. For example, a position indicator may include instructions or patterns 55 to the individual associated with the medical package to place the medical package at a certain orientation with respect to a position indicator that corresponds with the instructions provided by processor 102.

In some embodiments, there may be more than one medical package 18 and mat 50 associated with a relevant retrieval location, such as the retrieval region. The color, sheen, shape, or the surface pattern 52, may be different for each mat 50 associated with the more than one medical package 18. As such, the computing device 100 may instruct the UAV 10 to recognize and identify features of the mat 50 that is associated with designated medical package 18 to be retrieved by the UAV 10.

In some embodiments, the mat 50 may comprise hard or soft material that may be machine washable material. In an example, the mat is a polymer sheet with surface pattern on a top side and unadorned on the bottom side. The mat 50 may include one or more weights 54 along a peripheral edge to prevent unwanted movement of the mat 50 once it has been placed. The weights 54 may be placed in pockets 56. The mat 50 may include one or more additional pockets 56 for placing thermal packets 58 or thermal earmarks 60 therein. The mat 50 may include more than one thermal earmark such that the temperatures of each can be averaged to determine the amount of time that the medical package 18 was in the relevant retrieval location for retrieval. In some embodiments, the thermal packet 58 is located directly under the medical package 18. In some embodiments, the mat 50 may include a thermally insulated sleeve 62 (FIG. 3D) that at least partially wraps around the medical package 18.

The thermal packets 58, thermal earmark 60, and sleeve 62 may be removable from the mat 50 such that they can be placed in a thermally controlled environment (refrigerator, freezer, oven, or microwave) before being placed in conjunction with the medical package 18 on the mat 50.

Figure 3D:
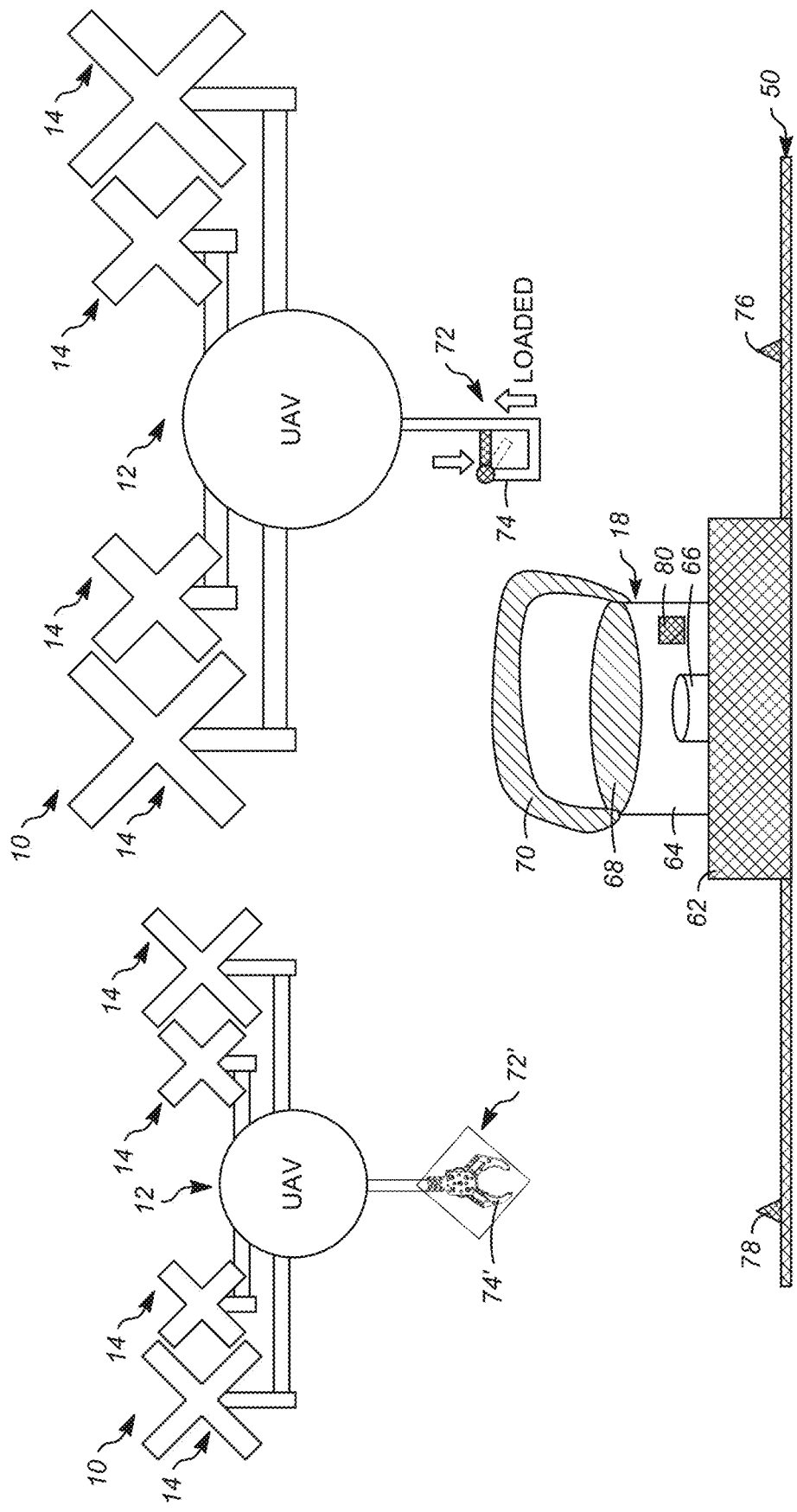
FIG. 3D generally illustrates engagement of a medical package according to the principles of the present disclosure.

FIG. 3D generally illustrates a medical package 18, a mat 50, and a UAV 10. The medical package 18 includes an enclosed body 64 that surrounds the payload 66. The body 64 includes a lid 68 or access door for the placement and removal of payload 66. The body 64 is configured to sit upright and thus may have a generally flat base. The body 64 may comprise relatively hard or rigid plastic material and may have circular, triangular, or other cross-sections. The cross-section of the medical package 18 may be the same as the outline of the mat 50 for purposes of orientation indication. In some embodiments, the body 64 may include a number of aerodynamic shapes, for example, spherical, tetrahedron, wing, or the like.

A connection device 70 attaches to an upper portion of the body 64 such that it can be grabbed or otherwise connected to by the UAV 10. The connection device 70 may include a strap or other suitable means. In some embodiments, the strap may comprise semi-rigid material such that it can be free standing for easy connection to the UAV 10. As further illustrated in FIG. 3D, the carrier 16 of the UAV 10 may include one or more arms 16' that include an engaging member 72, 72' for connecting to the connection device 70. The engaging member 72, such as a hook, may include one or more movable components 74 for securing the medical package 18 to the UAV 10 by forming a strong connection with the connection device 70 such that it cannot be dislodged during travel along the delivery route.

The movable components 74 may include a spring-loaded latch that pivots under the weight of the medical package 18 and allows the strap to enter the hook before pivoting back to completely close the hook access. Alternatively, the engaging member 72' may include movable components 74' that may include a movable finger that grabs the connection device 70 based on instructions from the computing device. The mat 50 may include one or more mat sensors 76 and mat communication devices 78 for further improving the accuracy of thermal and power budgeting of the UAV 10. For example, the mat sensors 76 may include a timer that tracks the time at which the mat 50 and the medical package 18 has been at the relevant retrieval location for retrieval.

The timer may be initiated automatically as a result of reading an ambient environment condition (e.g., sunlight) or it may be manually initiated at the time that the individual associated with the medical package places the mat 50 at the relevant retrieval location. The mat communication devices 78 may include wireless communication to the computing device 100 and communication device 24 of one or more environmental, thermal, or temporal conditions. The mat 50 and medical package 18 may include one or more tracking devices 80, such as an RFID tag, proximity sensor, or other similar technology for guiding the UAV 10 directly to the location of the medical package or the location of the mat 50 once it is within range to read tracking device 80.

The system 200 may include a method wherein the mat 50 is initially shipped with the medical package 18 to the individual associated with the medical package, with instructions on preparing the payload (e.g., harvesting a biological sample), packaging, and placement of mat 50 and the medical package 18 for retrieval. The components of the mat 50, including the shape, may vary depending on thermal budget of the associated medical package 18. For example, when the medical package 18 has a large thermal budget, it may be less necessary to include a thermal sleeve 62. The sleeve 62 or thermal pack 58 may be electrically thermally controlled with one or more batteries and cooling/heating systems.

In some embodiments, the computing device 100 and the system 200 may perform the methods described herein. However, the methods described herein as performed by the computing device 100 and the system 200 are not meant to be limiting, and any type of software executed on a computing device or a combination of various computing devices may perform the methods described herein without departing from the scope of this disclosure.

Figure 4:
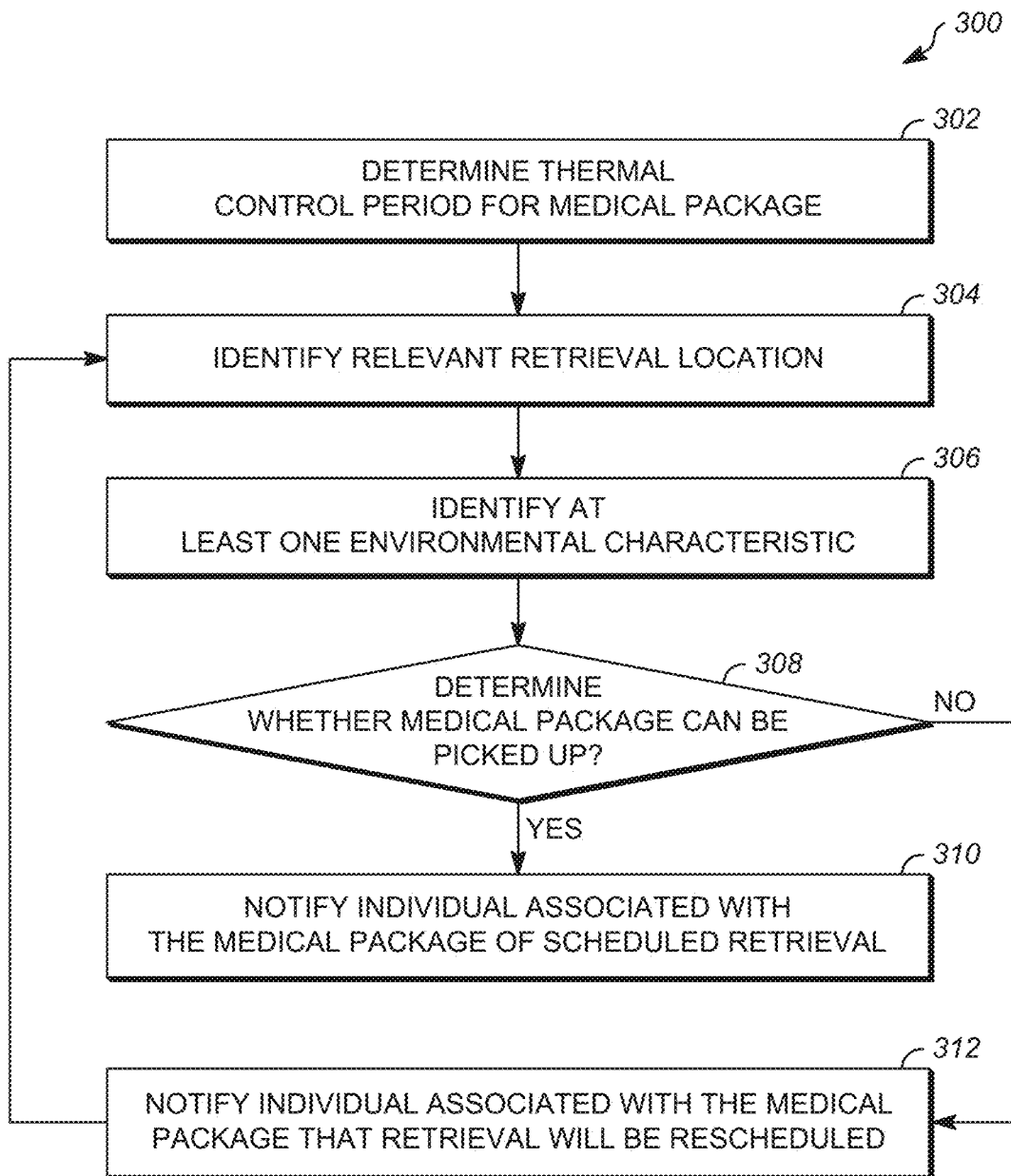
FIG. 4 is a flow diagram generally illustrating a medical package retrieval and delivery method according to the principles of the present disclosure.

FIG. 4 is a flow diagram generally illustrating a medical package retrieval method 300 according to the principles of the present disclosure. At 302, the method 300 determines a thermal control period for a medical package. For example, the computing device 100 determines the thermal control period or budget for the medical package 18.

At 304, the method 300 identifies a relevant retrieval location. For example, the computing device 100 determines, using the received instructions to retrieve the medical package 18 from a designated retrieval position.

At 306, the method 300 identifies at least one environmental characteristic. For example, the computing device 100 identifies at least one of the environmental characteristics of the delivery route and relevant retrieval location for the medical package 18.

At 308, the method 300 determines whether to retrieve the medical package. For example, the computing device 100 determines whether to retrieve the medical package 18 during the estimated retrieval period based on the at least one environmental characteristic of the delivery route. The determination to retrieve the medical package may be based on if there is sufficient thermal budget in view of the at least one environmental characteristic.

At 310, if the method determines that the medical package 18 can be retrieved within the thermal budget, the method 300 notifies an individual associated with the medical package of the scheduled retrieval. For example, the computing device 100 generates a notification and communicates an estimated retrieval time with a request to place the medical package 18 in the relevant retrieval location for retrieval. Step 310 may include providing additional instructions to the individual associated with the medical package on when and where to place the medical package 18 and when and where to place the mat 50. For example, the method pay provide a period within the thermal budget in which to place the medical package 18.

At 312, if the method determines that the medical package 18 cannot be retrieved within the thermal budget, the method 300 notifies an individual associated with the medical package that retrieval of the medical package will be rescheduled. For example, the computing device 100 may generates a notification that includes additional instruction to the individual associated with the medical package on when and where to place the medical package 18 and when and where to place the mat 50 as the retrieval time is rescheduled. For example, Step 312 may include instructing the individual associated with the medical package to place the medical package 18 and mat 50 in a thermally controlled location, such as a refrigerator.

Figure 5:
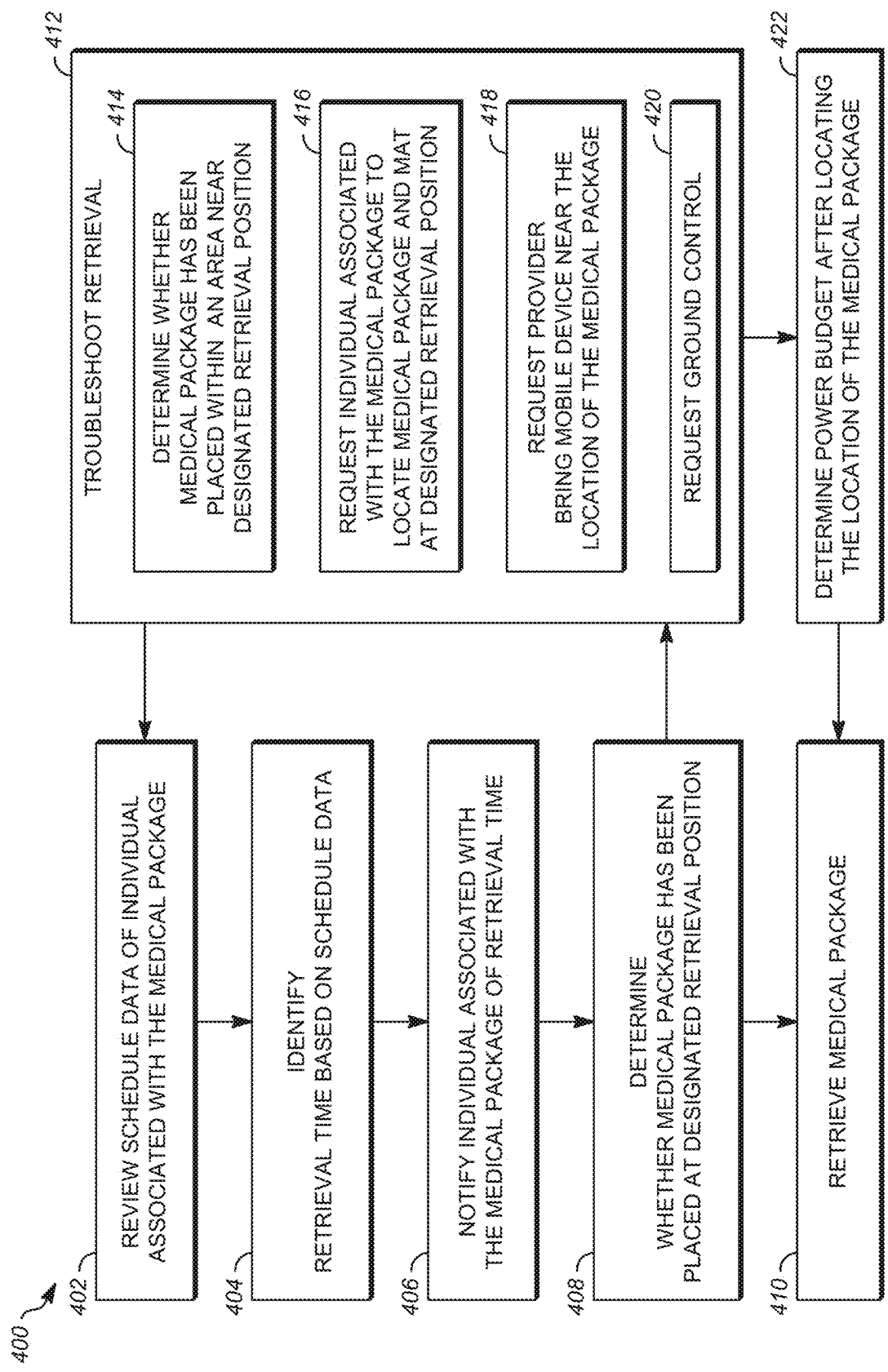
FIG. 5 is a flow diagram generally illustrating an alternative medical package retrieval and delivery method according to the principles of the present disclosure.

FIG. 5 is a flow diagram generally illustrating an additional medical package retrieval and delivery method 400 according to the principles of the present disclosure. At 402, the method 400 reviews schedule data of an individual associated with the medical package. For example, the computing device 100 may review schedule data including a work schedule or vacation. Schedule data may be communicated to the computing device 100 by the individual associated with the medical package, for example, via mobile computing device 202.

At 404, the method 400 identifies a retrieval time based on the schedule data. For example, the computing device may cross-reference the availability of the individual associated with the medical package and the availability of a UAV 10. For example, the computing device 100 may determine a period in which the individual associated with the medical package and a UAV will be available.

At 406, the method 400 notifies the individual associated with the medical package of the retrieval time. For example, the computing device 100 may automatically generate a notification and communicate the retrieval details to the individual associated with the medical package. Step 406 may include, with the computing device 100 requesting confirmation of receipt and confirmation of availability by the individual associated with the medical package. Confirmation may be requested via the mobile computing device 202.

At 408, the method 400 determines whether the medical package 18 has been placed at the designated retrieval position. For example, a UAV 10 may travel to the retrieval region and may communicate the medical package status to the computing device 100 upon arrival. In some embodiments, a second UAV 10' on a second delivery may be instructed to deviate from a delivery or retrieval path to determine the medical package status based on power budget availability and proximity to the relevant retrieval location.

At 410, if the medical package 18 is at the designated retrieval position, the medical package is retrieved. For example, the computing device 100 instructs the UAV 10 to retrieve the medical package 18. If the medial package 18 is at the designated retrieval position but unable to be retrieved, then the method may continue starting at step 714 of method 700.

At 412, if the medical package 18 is not at the designated retrieval position, then the method 400 may troubleshoot the retrieval. For example, the computing device 100 may initiate a troubleshooting protocol including one or more of steps 414 through 420.

At 414, the method 400 may determine if the medical package was been placed within an area near the designated retrieval position. For example, the computing device 100 may instruct the UAV 10 or UAV 10' to search within a predefined radius or area of the designated retrieval position. For example, the method 400 may include searching within or around the retrieval region for a location of the medical package that deviates from designated retrieval position.

At 416, the method 400 may request that the individual associated with the medical package place the medical package 18 and mat 50 at the designated retrieval position. For example, the computing device 100 may communicate to the individual associated with the medical package that the medical package 18 and mat 50 are not at the designated retrieval position and must be placed there. Instructions may include a period based on power budget constraints.

At 418, the method 400 may request that the individual associated with the medical package bring their mobile device near the location of the medical package. For example, the computing device 100 may instruct the UAV 10 or UAV 10' to travel to the coordinates of the mobile device.

At 420, the method 400 may include a request for ground control. For example, if the UAV 10 or UAV 10' cannot locate the medical package 18 and mat 50, the computing device 100 may request ground control, which may include controlling the flight path of the UAV 10 or UAV 10', or merely visually monitoring one or more images captured to look for the medical package 18 and mat 50.

At 422, the method 400 may include determining a power budget after locating the location of the medical package. For example, after locating the location of the medical package, the computing device 100 may determine the remaining power budget of the UAV 10 to either proceed by instructing the UAV 10 to retrieve and deliver the medical package 18 or not retrieve the medical package 18 and return to the hub 210.

Figure 6:
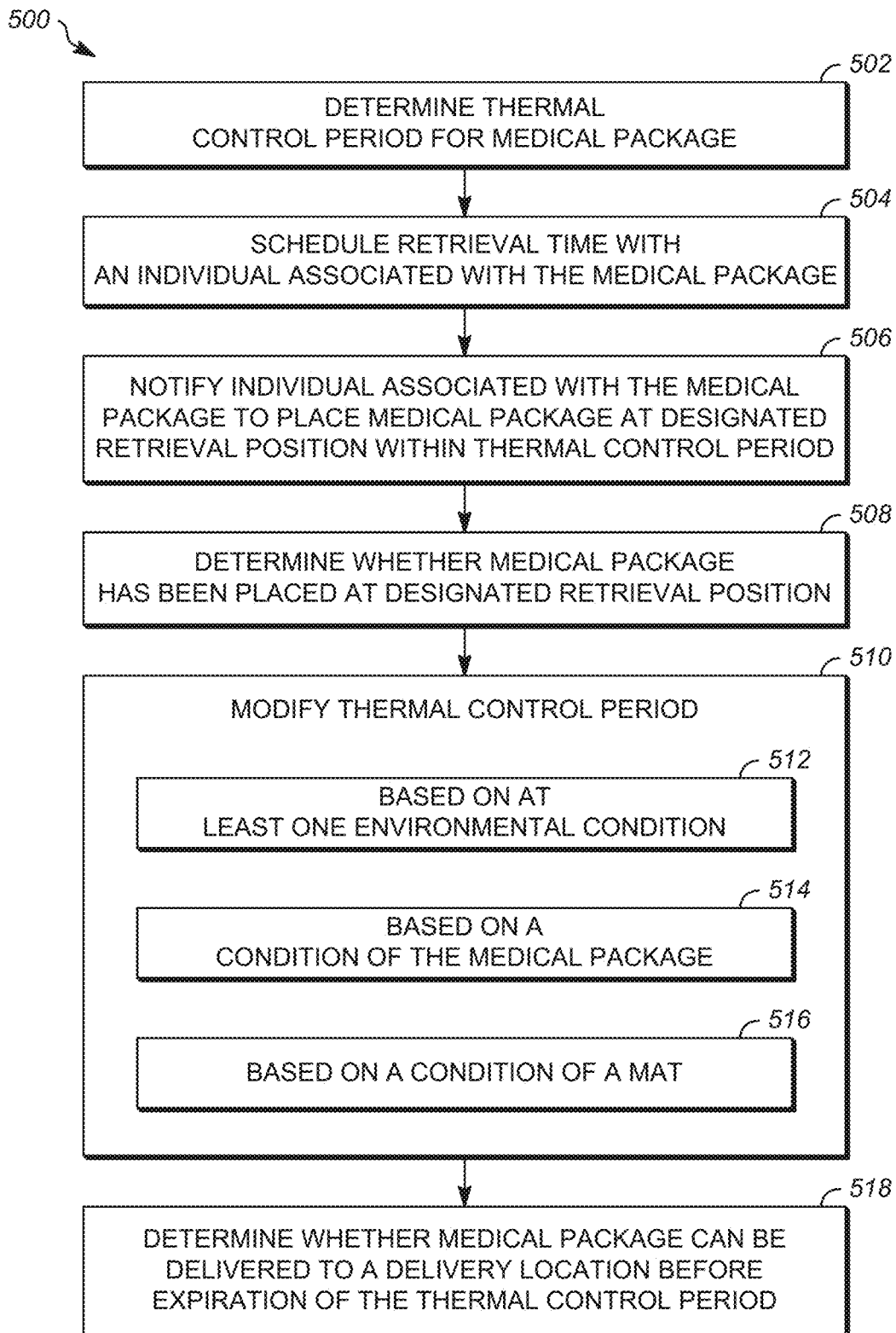
FIG. 6 is a flow diagram generally illustrating a second alternative medical package retrieval and delivery method according to the principles of the present disclosure.

FIG. 6 is a flow diagram generally illustrating an yet another medical package retrieval and delivery method 500 according to the principles of the present disclosure. At 502, the method 500 determines a thermal control period for a medical package. For example, the computing device 100 determines the thermal control period for the medical package 18.

At 504, the method 500 schedules a retrieval time with an individual associated with the medical package. For example, the computing device 100 may provide a series of periods to the individual associated with the medical package and otherwise notify the individual associated with the medical package of needed availability.

At 506, the method 500 may notify the individual associated with the medical package place the medical package 18 at a designated retrieval position within the thermal budget. For example, the computing device 100 may generate a notification and communicate with a mobile computing device 202 of the designated retrieval position and the thermal budget. For example, if the thermal budget is 1 hour and the total travel time of the UAV 10 between lift-off, retrieval, and delivery is 1 and ½ hours, then the computing device 100 may include notifying the individual associated with the medical package to place the medical package 18 at the retrieval time no sooner than a ½ hour into the travel time of the UAV 10.

At 508, the method 500 continues by determining if the medical package has been placed at the designated retrieval position. As previously described, this may be accomplished by obtaining confirmation by the computing device 100 from at least one of the UAV 10, the UAVs 10', or the individual associated with the medical package.

At 510, if the medical package 18 is at the designated retrieval position or if the location of the medical package has been otherwise identified as detailed in method 400, then the method 500 continues by modifying the thermal control period or budget. For example, at 510 the computing device 100 may modify the thermal control period or budget with one or more of those steps outlined in steps 512-516.

At 512 the method 500 may modify the thermal budget based on at least one environmental factor. For example, if it begins to rain, the thermal budget may deplete more quickly and need to be modified by the computing device 100.

At 514, the method 500 may modify the thermal budget based on a condition of the medical package 18. For example, the thermal budget may be changed by the computing device 100 based on a sensed internal temperature of the medical package 18.

At 516, the method 500 may modify the thermal budget based on a condition of the mat 50. For example, the thermal budget may be changed by the computing device 100 based on the status of a thermal pack or a thermal earmark located on or in the mat 50.

At 518, the method 500 determines whether the medical package can be delivered to a delivery location before the expiration of the thermal control period. For example, if an unanticipated occurrence, such as an environmental factor or the individual associated with the medical package placing the medical package 18 at the designated retrieval position before a recommended period, then the computing device 100 may request that the individual associated with the medical package relocate the medical package 18 in a thermal controlled environment or harvest a new sample and reschedule retrieval.

Figure 7:
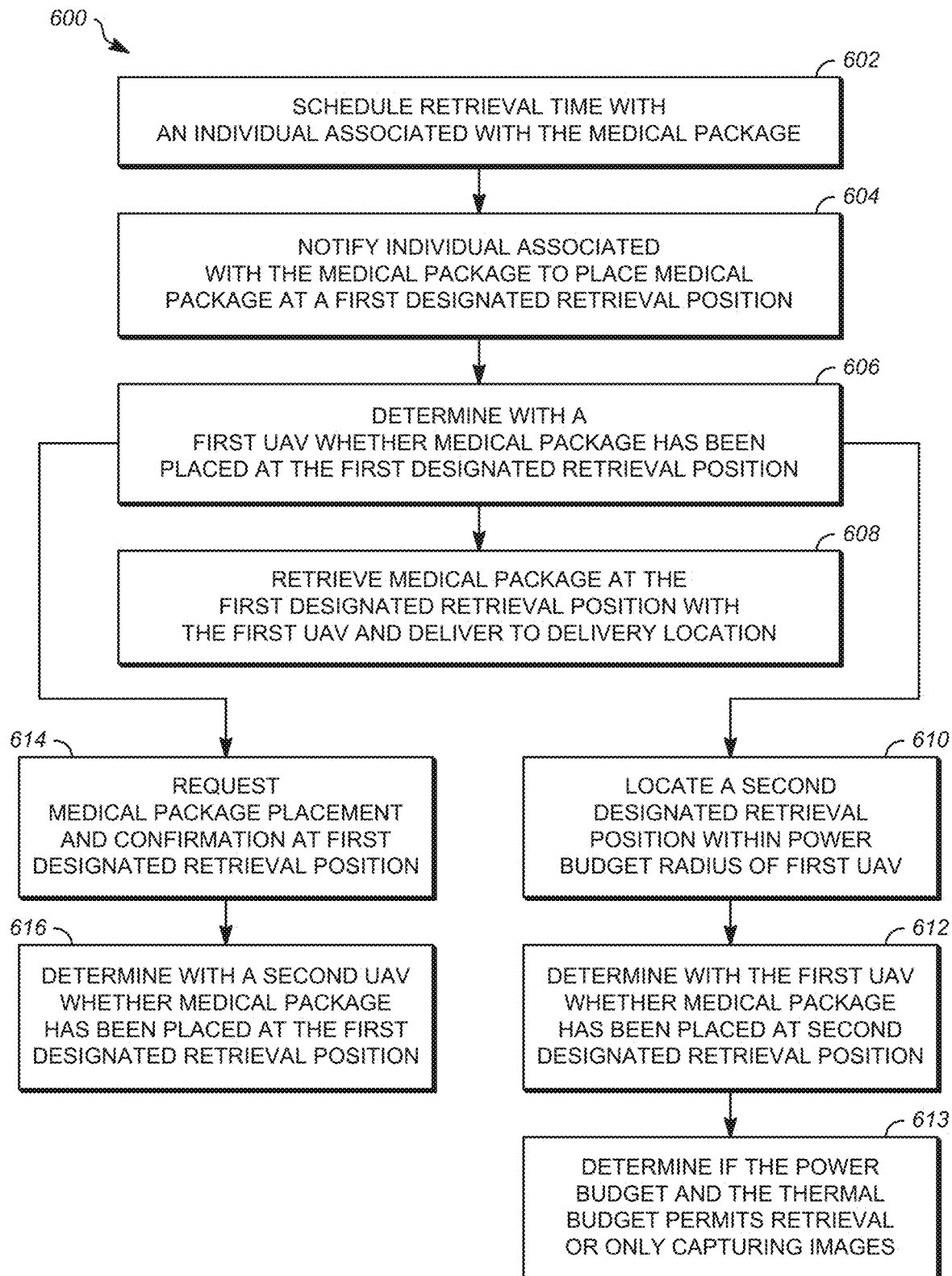
FIG. 7 is a flow diagram generally illustrating a third alternative medical package retrieval and delivery method according to the principles of the present disclosure.

FIG. 7 is a flow diagram generally illustrating yet another medical package retrieval and delivery method 600 according to the principles of the present disclosure. At 602, the method 600 schedules a retrieval time with an individual associated with the medical package. For example, the computing device 100 may schedule a retrieval time, which may be partially based on one or more of a schedule or a confirmation of availability of an individual associated with the medical package.

At 604, the method 600 may notify the individual associated with the medical package to place the medical package 18 at a first designated retrieval position. For example, the computing device 100 may generate a notification and communicate to the individual associated with the medical package to place the medical package 18 at a first designated retrieval position within a thermal control period.

At 606, the method 600 may determine with a first UAV 10 whether the medical package 18 has been placed at the first designated retrieval position. For example, the first UAV 10 may communicate one or more images of the designated retrieval position or medical package 18 to the computing device 100.

At 608, the method 600 may allow the first UAV 10 to retrieve the medical package 18 and to deliver it to the delivery location. For example, if the medical package 18 is at the designated retrieval position, the computing device 100 may instruct the first UAV 10 to retrieve the medical package 18 and deliver it to the delivery location.

At 610, the method 600 may locate a second designated retrieval position within the power budget of the first UAV 10. For example, if the medical package 18 is not at the relevant retrieval location associated with the designated retrieval position, the first UAV 10 may, upon arriving at the first relevant retrieval location, be instructed by the computing device 100 to travel to a second relevant retrieval location within a power budget radius of the first UAV 10. The power budget radius may be within an area that the first UAV 10 is estimated to have enough power to retrieve and deliver a second medical package (or capture an image and return to hub 210). The term enough power may include having a surplus of at above or below 25% remaining charge, having at above or below 15% remaining charge, or having at above or below 10% remaining charge.

At 612, the method 600 may determine if the second medical package is placed at the second designated retrieval position. If the second medical package is placed at the second designated retrieval position, at 613 the remaining power budget and thermal budget of the second medical package is used to determine by computing device 100 whether or not the first UAV 10 is instructed to retrieve the second medical package, or if there is an insufficient remaining power budget or thermal budget, to capture an image of the medical package to confirm placement and location. If the second medical package is not at the second relevant retrieval location, then the computing device 100 may request that the individual associated with the medical package place it at the second designated retrieval position. Moreover, if there is a remaining power budget, the method 600 may include repeating steps 610 and 612 with a third scheduled designated retrieval position, a fourth scheduled designated retrieval position, etc.

At 614, the method 600 may request that the individual associated with the medical package place the first medical package at the first relevant retrieval location. For example, during steps 610 through 613 the method 600 may include the computing device 100 trying to communicate with the individual associated with the first medical package until they confirm receipt and instructions to place the first medical package.

At 616, the method 600 may include instructing with the computing device 100 that a second UAV 10' travel to the first relevant retrieval location to determine if the first medical package has been placed there. For example, the second UAV 10' may have initially been scheduled to travel to the second designated retrieval position, but upon notification that the second medical package was retrieved by the first UAV 10, it is rescheduled to travel to the first relevant retrieval location by the computing device 100. At 616, the method 600 may request a pre-confirmation of placement by the individual associated with the medical package before sending the second UAV 10' to the first relevant retrieval location.

Figure 8:
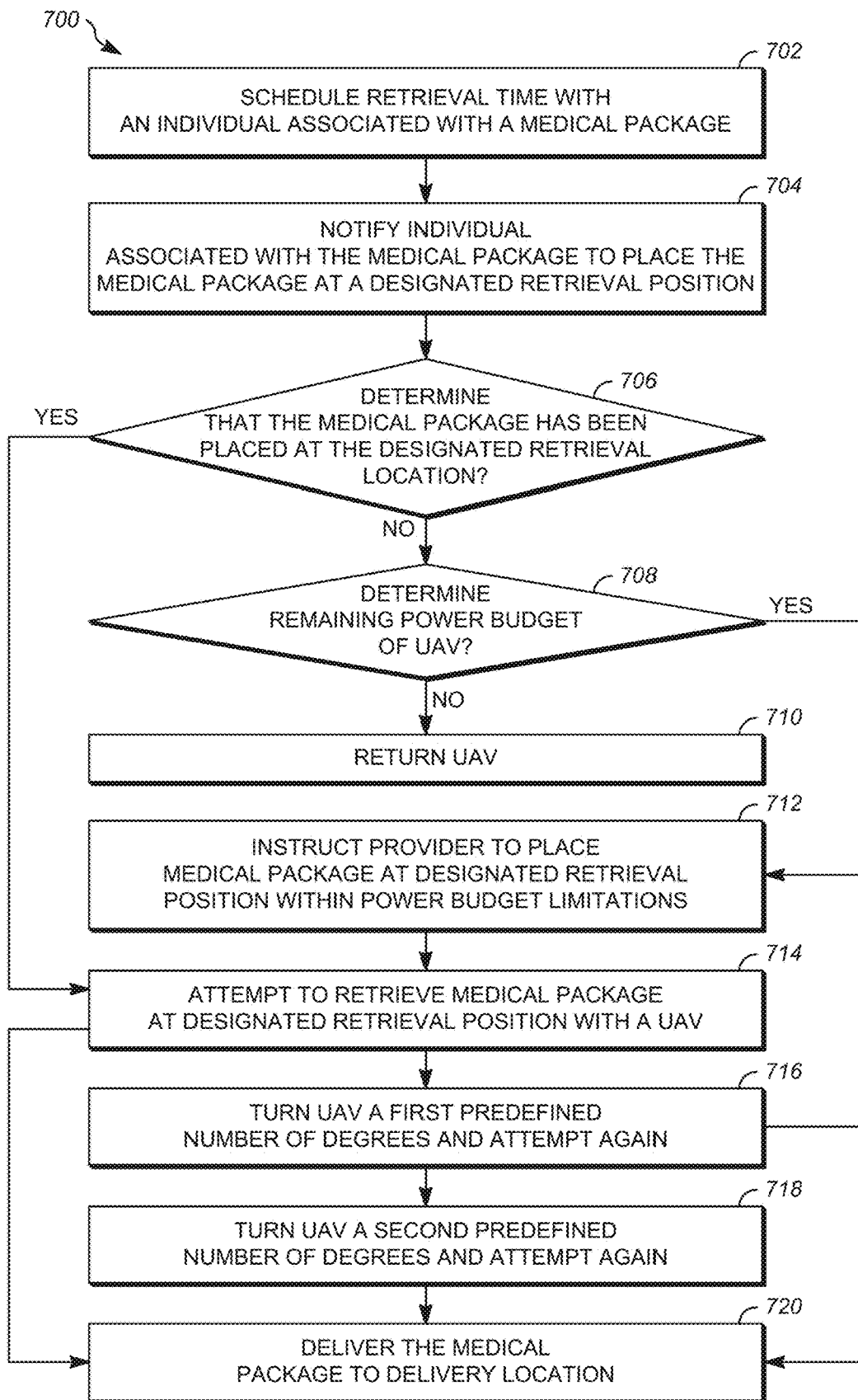
FIG. 8 is a flow diagram generally illustrating a fourth alternative medical package retrieval and delivery method according to the principles of the present disclosure.

FIG. 8 is a flow diagram generally illustrating another medical package retrieval and delivery method 700 according to the principles of the present disclosure. At 702, the method 700 may schedule a retrieval time with an individual associated with the medical package. For example, the computing device 100 may schedule a time within a period in which the individual associated with the medical package is available or estimated to be available.

At 704, the method 700 may notify the individual associated with the medical package to place the medical package 18 in a designated retrieval position. For example, the computing device 100 may generate a notification and notify an individual associated with the medical package of a period in which to place the medical package 18 so the medical package 18 can be delivered within the thermal budget.

At 706, the method 700 determines if the medical package has been placed at the designated retrieval position. For example, the determination may be completed by providing images from the UAV 10, UAV 10' or a notification from the individual associated with the medical package to the computing device 100.

At 708, if the medical package has not been placed at the designated retrieval position, then the method 700 determines the remaining power budget of the UAV 10. For example, the computing device 100 may determine an amount of power required to retrieve and deliver the medical package and may determine how long the UAV 10 can idle near the designated retrieval position and still have enough power budget to retrieve and deliver the medical package 18. Enough power budget may include providing a buffer or surplus as previously described.

At 710, if the power budget is insufficient, the method 700 instructs the UAV 10 to return to the hub 210. For example, if the computing device 100 determines that the power budget is insufficient, it may instruct the UAV 10 to return to the hub 210 or other charging/battery changing station. It should be appreciated that unless otherwise limited, the term hub may include various charging stations, a central hub, and a delivery location.

At 712, the method 700 may include instructing an individual associated with the medical package to place the medical package 18 at the designated retrieval position. For example, the computing device 100 may instruct the individual associated with the medical package to place the medical package 18 at the designated retrieval position within a period as determined by the remaining power budget and may include a request for confirmation of same via the mobile computing device 202.

At 714, once the medical package 18 is at the designated retrieval position or the location of the medical package is otherwise identified, the method may include a first attempt to retrieve the medical package. For example, the computing device 100 via the UAV 10 may identify at least one characteristic of the mat. For example, computing device 100 via the UAV 10 may identify the shape, color, sheen, or position indicia on the mat 50 to determine an orientation of the medical package 18 wherein the UAV 10 may orient its body 12 and engaging member 72 to match with a connection device 70, such as a strap.

At 716, if the first attempt is unsuccessful, the method 700 may include rotating the UAV 10 a first predefined number of degrees and trying again. For example, the computing device 100 may instruct the UAV 10 to initially rotate 90°, 45°, or 25°.

At 718, if the second attempt is unsuccessful, the method 700 may include rotating the UAV 10 a second predefined number of degrees and trying again. For example, the computing device 100 may instruct the UAV 10 to again rotate another 90°, 45°, or 25°. The second predefined number of degrees may be less than the first predefined number of degrees.

After any time in which the medical package has been successfully retrieved, at 720, the method 700 may include delivering the medical package to a delivery location. For example, after a successful retrieval, the computing device 100 may instruct the UAV 10 to deliver the medical package to the delivery location.

Figure 9:
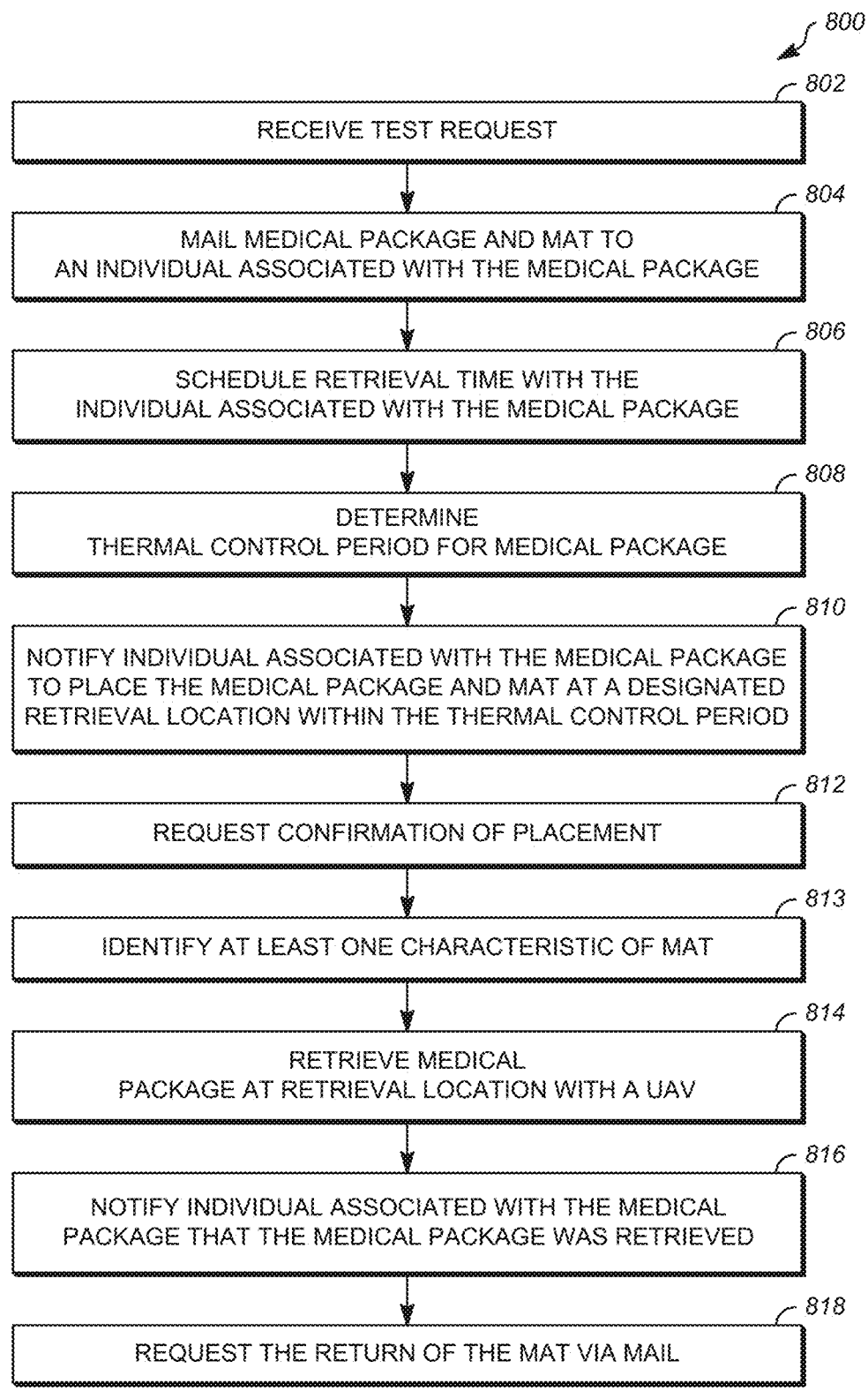
FIG. 9 is a flow diagram generally illustrating a fifth alternative medical package retrieval and delivery method according to the principles of the present disclosure.

FIG. 9 is a flow diagram generally illustrating another medical package retrieval and delivery method 800 according to the principles of the present disclosure. At 802, the method 800 may include receiving a testing request from an individual associated with the medical package.

At 804, the method 800 may include mailing a medical package 18 and a mat 50 to the individual associated with the medical package. For example, the computing device 100 may instruct mailing the medical package 18 and mat 50 to the individual associated with the medical package along with instructions for harvesting, thermal control before retrieval, and proper placement of the medical package 18 and mat 50 before a scheduled retrieval. At 804 the method 800 may include, with the computing device 100, providing preparation information to the individual associated with the medical package, the preparation information indicating, at least, one or more designated retrieval positions to arrange a retrieval mat and the medical package.

At 806, the method 800 may include scheduling a retrieval time with the individual associated with the medical package. For example, the computing device 100 may review an estimated availability of an individual associated with the medical package and may request a confirmation by the individual associated with the medical package of their availability for a specific retrieval time.

At 808, the method 800 may include determining a thermal control period for the medical package. For example, the computing device 100 may determine a thermal control period, which may be based on at least one or more of the types of payload, at least one environmental condition, and the delivery path.

At 810, the method 800 may include notifying the individual associated with the medical package to place the medical package and mat in a designated retrieval position within the thermal budget period. For example, the computing device 100 may generate a notification and instruct the individual associated with the medical package to place the medical package in a time that the thermal budget will be not depleted until after it has been received and delivered to a delivery location.

At 812, the method 800 may request a confirmation of placement. For example, the individual associated with the medical package may communicate a confirmation via their mobile device 202 and via an application 208 to the computing device 100. As another example, prior to instructing the unmanned aerial vehicle to traverse the three-dimension flight path between the starting location and the relevant retrieval location (designated retrieval position), the computing device 100 may require a confirmation from the person associated with the medical package indicating the medical package is in the designated retrieval position.

At 813, the method 800 may include identifying the at least one characteristic of the mat. For example, the computing device 100 may identify a color spectrum and color contrast of the mat, which may highly contrast the environment and may be within visible or non-visible spectrum. At 813, the method 800 may also include identifying, with the computing device 100, at least one characteristic that indicates at least one of a position and an orientation of the medical package on the mat. At 813, the method 800 may also include identifying, by the computing device 100, at least one characteristic that indicates an altitude of the UAV 10 from the mat.

At 814, the method 800 may include retrieving the medical package with a UAV 10, for example, via instructions from the computing device 100. After retrieval, at 816, the method 800 may then include sending a notification to the individual associated with the medical package that the medical package was successfully retrieved. For example, the notification may be communicated to the individual associated with the medical package's mobile device 202 and via an application 208 and computing device 100.

At 818, the method 800 may include requesting that the individual associated with the medical package return the mat 50 via the mail. For example, the request may be communicated to the individual associated with the medical package's mobile device 202 and via an application 208 and computing device 100.

Figure 10:
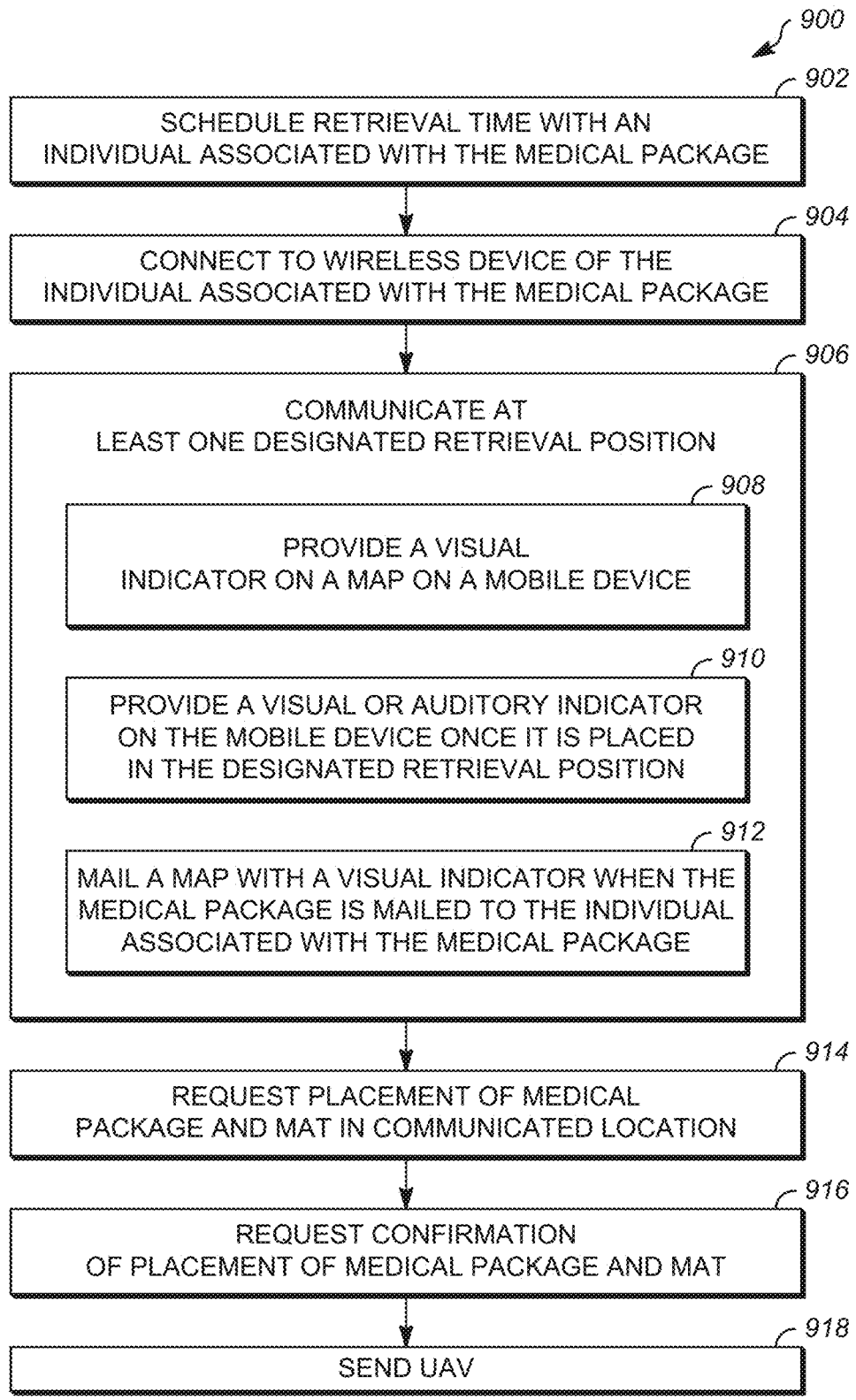
FIG. 10 is a flow diagram generally illustrating a sixth alternative medical package retrieval and delivery method according to the principles of the present disclosure.

FIG. 10 is a flow diagram generally illustrating another medical package retrieval and delivery method 900 according to the principles of the present disclosure. At 902, the method 900 may include scheduling a retrieval time with the individual associated with the medical package. For example, the scheduled retrieval time may include reviewing, with the computing device 100, the availability of the individual associated with the medical package and a requesting, with the computing device 100, a confirmation of availability by the individual associated with the medical package.

At 904, the method 900 may include connecting to a wireless device of the individual associated with the medical package. For example, the computing device 100 may request connection to the mobile computing device 202 via an application 208 or some other means.

At 906, the method 900 may communicate to the individual associated with the medical package at least one optimal relevant retrieval location, such as a designated retrieval position. For example, the computing device 100 may communicate the designated retrieval position to the mobile computing device 202, via an application 208, via another communication mechanism, or via one or more of the steps in 908 through 912.

At 908, the method 900 may include providing a visual indicator such as a pin of the at least one designated retrieval position on a map that is displayed on the mobile computing device. For example, the map may be interactive and provide real-time GPS guidance to the optimal relevant retrieval location via the computing device 100 and application data 208. As another example, at 908, the method 900 may include providing, via the computing device 100, a digital rendering of a map of the designated retrieval position and an indicator on the digital rendering of the map indicating the position at the designated retrieval position to arrange a retrieval mat and the medical package.

At 910, the method 900 may provide a visual or auditory indicator on the mobile computing device ("mobile device") once it is moved to an optimal location as a designated retrieval position. For example, the individual associated with the medical package may be instructed via the computing device 100 and application 208 to walk around a back yard with their mobile device, and the mobile device will provide an indication once it is placed in an optimal relevant retrieval location. As the designated retrieval position is entered by the mobile device, the method 900 may include capturing the GPS coordinates of the mobile device once it is located in the designated retrieval position. Step 910, may work in conjunction with step 908, wherein the visual indicator is placed on the map after determining a location of the designated retrieval position at 910 for later placement.

At 912, the method 900 may mail a map with a visual indicator with the medical package 18 and mat 50. For example, the computing device 100 may effectuate the scheduling, packaging, and mailing of the medical package 18 and mat 50.

At 914, the method 900 may request placement of the medical package 18 and the mat 50 in the communicated designated retrieval position. For example, the computing device 100 may account for the previously defined thermal budget period when requesting placement of the medical package 18 and mat 50. The request may be communicated to the mobile computing device 202 via an application 208 or some other means.

At 914, the method 900 may request a confirmation from the individual associated with the medical package that the medical package 18 and mat 50 have been placed in the communicated designated retrieval position. The request may be communicated to the mobile computing device 202 via an application 208 or some other means.

Once the placement is confirmed, at 918, the method 900 may instruct a UAV 10 to attempt retrieval. For example, the computing device 100 may instruct a UAV 10 to attempt retrieval. The location of the designated UAV may appear on the mobile device 202 of the individual associated with the medical package as relayed by the computing device 100.

Figure 11:
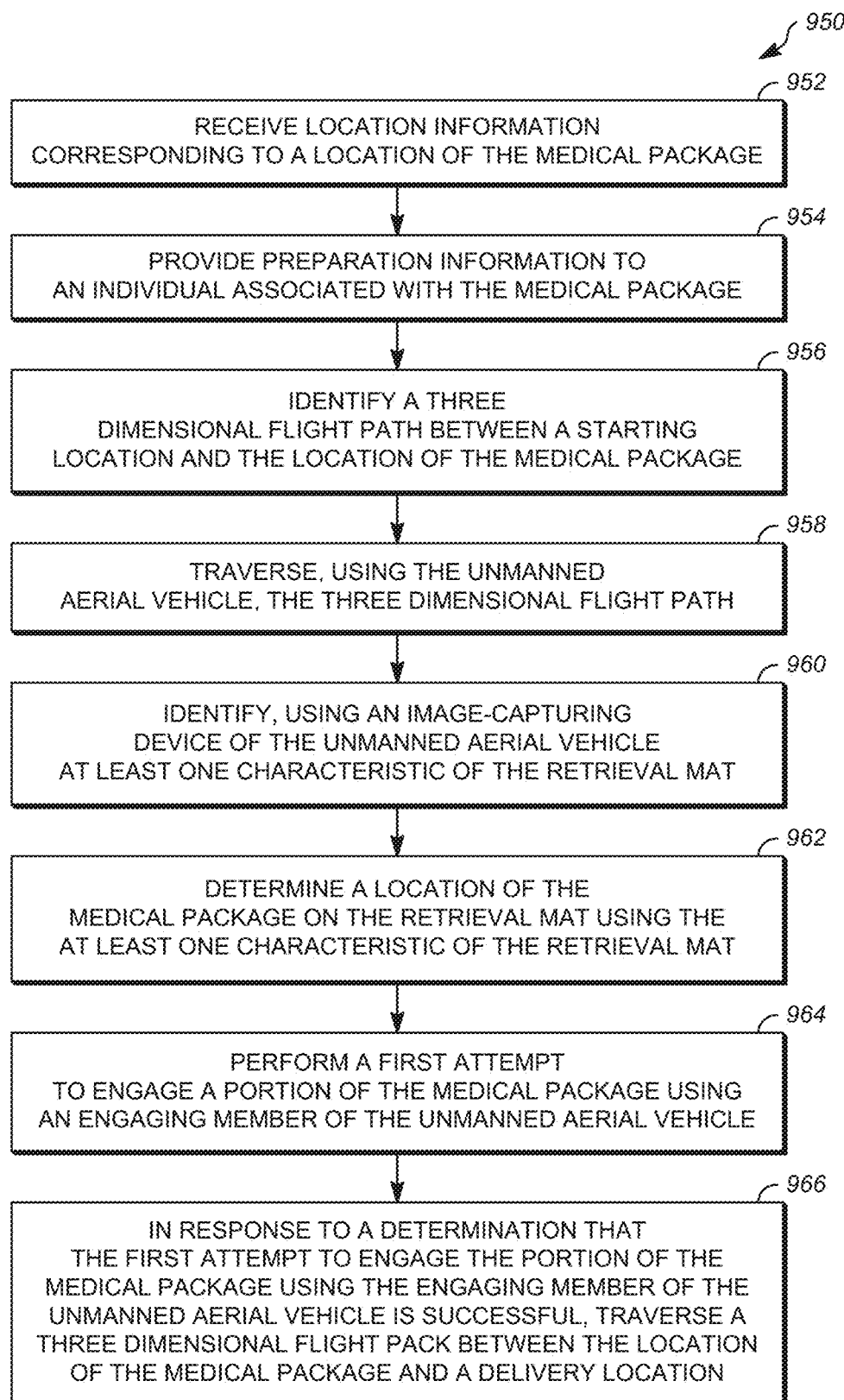
FIG. 11 is a flow diagram generally illustrating a seventh alternative medical package retrieval and delivery method according to the principles of the present disclosure.

FIG. 11 is a flow diagram generally illustrating another medical package retrieval and delivery method 950 according to the principles of the present disclosure. At 952, the method 950 may include receiving location information corresponding to a location of a medical package. For example, the computing device 100, may receive location information corresponding to a location of a medical package. The location information may include at least one of a retrieval region, a designated retrieval position, or the location of the medical package.

At 954, the method 950 may provide preparation information to an individual associated with the medical package, the preparation information may indicate, at least, a position at the location of the medical package to arrange a retrieval mat and the medical package. The preparation information may be provided by the computing device 100 to the mobile computing device 202.

At 956, the method 950 may identify a three-dimensional flight path between a starting location and the location of the medical package. For example, the computing device 100 may identify a three-dimensional flight path between a starting location and the location of the medical package.

At 958, the method 950 may traverse, using the unmanned aerial vehicle, the three-dimensional flight path. For example, the computing device 100 may instruct UAV 10 to traverse the three-dimensional flight path.

At 960, the method may identify, using an image-capturing device of the unmanned aerial vehicle at least one characteristic of the retrieval mat. For example, the computing device 100 may receive images captured by the image-capturing device 26 and identify the at least one characteristic of the retrieval mat 50.

At 962, the method may determine a location of the medical package on the retrieval mat using the at least one characteristic of the retrieval mat. For example, the computing device 100 may receive images captured by the image-capturing device 26 and identify the at least one characteristic of the retrieval mat 50 and determine the location of the retrieval mat 50.

At 964, the method may perform a first attempt to engage a portion of the medical package using an engaging member of the unmanned aerial vehicle. For example, the computing device may instruct the UAV 10 to attempted to engage a connection device 70, such as a strap, on the medical package.

At 966, the method may in response to a determination that the first attempt to engage the portion of the medical package using the engaging member of the unmanned aerial vehicle is successful, traverse a three-dimensional flight path between the location of the medical package and a delivery location. For example, the computing device 100 may instruct the UAV 10 to deliver the medical package 18 to the delivery location upon a successful engagement with the medical package 18.

It should be appreciated that the methods 300-950 can be used in conjunction with one another. In some embodiments, the identifying of at least one environmental characteristic of method 300 to determine if the medical package can be retrieved may be used in conjunction with each of the other methods. In some embodiments, the scheduling steps 402-406 and troubleshooting steps 412 through 420 may be used in conjunction with each of the other methods. In some embodiments, the modification of the thermal control period as described in method 500 at 510 through 518 may be used in conjunction with each of the other methods. In some embodiments, the utilization of the second relevant retrieval locations and second UAV as described in the method 600 at steps 610 through 616 may be used in conjunction with each of the other methods. In some embodiments, the multiple retrieval attempts in method 700 at steps 714 through 718 may be used in conjunction with each of the other methods. In some embodiments, the test request and mailing steps at 802, 804, 816, 818 of method 800 may also be used in conjunction with each of the other methods. In some embodiments, the communication steps in method 900 at steps 904 through 912 may also be used in conjunction with each of the other methods. In some embodiments, the steps 950 through 966 may be used in conjunction with each of the other methods. While these are provided as examples, it should be appreciated that other combinations of steps are within the embodiments of the disclosure.

Figure 12:
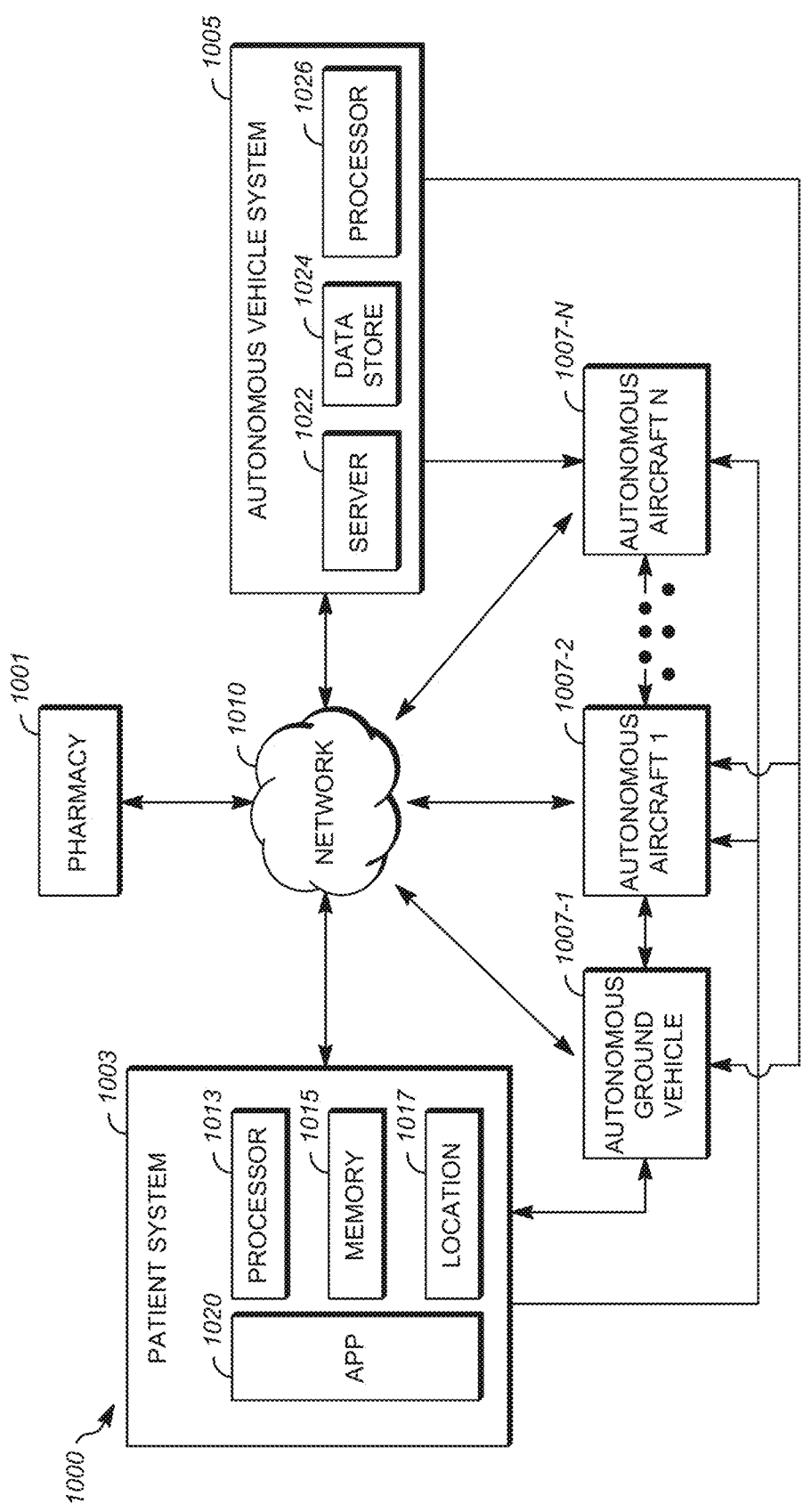
FIG. 12 generally illustrates a schematic view of the system according to the principles of the present disclosure.

FIG. 12 generally illustrates a schematic view of a system 1000 according to the principles of the present disclosure. The system 1000 includes a pharmacy and testing facility 1001, a patient (e.g., individual associated with the medical package) system 1003, an autonomous vehicle system 1005, and a plurality of autonomous vehicles 1007-1, 1007-2 . . . 1007-N, which may be connected over a network 1010communication network 1010, e.g., a global computer system such as the Internet, or a mobile communication system.

The pharmacy and testing facility 1001 may include a plurality of systems to adjudicate, approve, schedule, retrieve and deliver an order, such as a testing order. The pharmacy and testing facility 1001 may include a device associated with a retail pharmacy or testing facility location (e.g., an exclusive pharmacy location, a grocery store with a retail pharmacy, a laboratory testing facility, or a general sales store) or other type of pharmacy and testing facility locations. The pharmacy and testing facility may use a device to submit the claim to a benefits management system for adjudication. For example, this may allow the sharing of member (e.g., individual associated with the medical package) information such as drug and testing history that may allow the pharmacy and testing facility to better service a member (for example, by providing the harvesting, storing, and placement for retrieval instructions in a particular manner).

In some embodiments, a benefit manager device may track testing requests and other information for users that are not yet members, or have not identified themselves as members, at the time (or in conjunction with the time) in which they seek or are scheduled to have a test. The pharmacy and testing facility 1001 may include a fulfillment device, an order processing device, and a management device in communication with each other directly and over a network. The order processing device may receive information regarding various testing services and may direct an order component to one or more devices of the fulfillment device at a pharmacy or testing facility. The fulfillment device may fulfill, dispense, aggregate, and pack the order components of the medical package in accordance with one or more testing orders directed by the order processing device. The fulfillment device may include automated systems to package the medical package, mat, and related components.

The pharmacy and testing facility 1001 may set the thermal parameters that must be adhered to. Accordingly, the pharmacy and testing facility 1001 may include one or more physical computers and data storage. The data store may store related to each individual drug or sample that requires temperature control. An example of such a system is described in U.S. Pat. No. 8,600,903 issued to Charles Eller, filed Jun. 14, 2007, and U.S. patent application Ser. No. 14/630,373, filed Feb. 24, 2015, which are both hereby incorporated by reference for any purpose.

The pharmacy and testing facility 1001 packages testing orders for mailing and then later retrieval and delivery by one or more of the autonomous vehicles 1007-1, 1007-2 . .

. 1007-N. The pharmacy and testing facility 1001 may include shipping stations whereat one or more of the autonomous vehicles 1007-1, 1007-2 . . . 1007-N, or ground shippers may pick up a medical package and mat order for delivery to a patient delivery location. The pharmacy and testing facility may communicate with the patient system 1003, which may be an app on a computing device registered to the patient/individual associated with the medical package, the autonomous vehicle system 1005 and each of the autonomous delivery vehicles 1007-1, 1007-2 . . . 1007-N. The information from the pharmacy and testing facility 1001 about an individual package may determine if the package is delivered by a ground vehicle 1007-1 or flow using an autonomous aircraft 1007-2 . . . 1007-N. The aircraft 1007-2 . . . 1007-N may include any of the components and perform the methods described herein. The aircraft may communicate with each other as a mesh network while in flight to share sensed data, e.g., environmental characteristics at the location of the aircraft.

The patient system 1003 may be used to place an order for a test by the member and their healthcare provider, e.g., for mailing or delivery by one or more of the autonomous vehicles 1007-1, 1007-2 . . . 1007-N and later retrieval and return deliver by one or more of the autonomous vehicles 1007-1, 1007-2 . . . 1007-N. The patient system 1003 may utilize one or more computing devices 1042 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 1020, such as a web browser or a dedicated application, and may be connected to or otherwise communicate with the pharmacy and testing facility 1001 or the autonomous vehicles 1007-1, 1007-2 . . . 1007-N through the network 1010communication network 1010 using the transmission and the receipt of digital data. The patient system 1003 includes a processor 1013 to execute dedicated instructions that are stored in a memory 1015.

The patient system 1003 may include a location sensor, e.g., satellite navigation, to track the location of the patient relative to the relevant retrieval location that the vehicle 1007-1, 1007-2 . . . or 1007-N will pick-up the medical package, for example, steps 908 and 910 in method 900. The patient system 1003 may also provide local weather data, e.g., temperature and sunlight to the present system to be used in the calculation of the thermal budget of a package being carried by the vehicle 1007-1, 1007-2 . . . 1007-N or waiting at the relevant retrieval location for pick-up. The vehicles 1007-1, 1007-2 . . . 1007-N may also communicate their location to the patient system 1003 to alert the patient when the UAV will arrive for pick-up. For example, the patient system 1003 may provide a thermal budget period in which the member/individual associated with the medical package can place the medical package in the relevant retrieval location. The patient system 1003, e.g., through the software application 820 and network, may communicate that the package has been picked up by the vehicles 1007-1, 1007-2 . . . 1007-N, the vehicle system 805 and to the pharmacy and testing facility 1001, such that the mat can be returned.

The autonomous vehicles 1007-1, 1007-2 . . . 1007-N may be any type or form of self-powered vehicle capable of being programmed or otherwise configured for autonomous travel to retrieve packages, e.g., medical packages with samples in need of controlled environments as described herein. Each of the autonomous vehicles may include one or more electrical components described herein, e.g., at least one processor, a memory, sensors, and communication devices to communicate with each other and through the network 1010. For example, the autonomous aircraft may receive instructions or other information or data via the communication device for its flight path, retrieval and delivery location, and sensing of the environment over the path over the network. In an example, the network 1010 and vehicles communicate wirelessly, e.g., over mobile protocols or standard wireless protocols such as Bluetooth® or any Wireless Fidelity (or "Wi-Fi"). The aircraft and ground vehicle may also communicate through one or more wired communication connections, e.g., Universal Serial Bus (or "USB") or fiber optic cable.

The autonomous vehicle system 1005 may include a server to provide travel paths and locations to the vehicles for the retrieval and delivery of packages. The autonomous vehicle system 1005 may include a memory to store the maps, weather, medical package conditions, at least one environment characteristic, vehicle data (e.g., distance capability, battery charge or "power budget", payload capacity, computed thermal budget for each package and the like) to be used by the server 1022 or a processor 1026. The server 1022 may also receive updated data from the patient system 1003 or the vehicles 1007-1, 1007-2 . . . 1007-N. This data may be used to calculate updated instructions for the vehicles or to trigger the instructions described herein.

Figure 13:
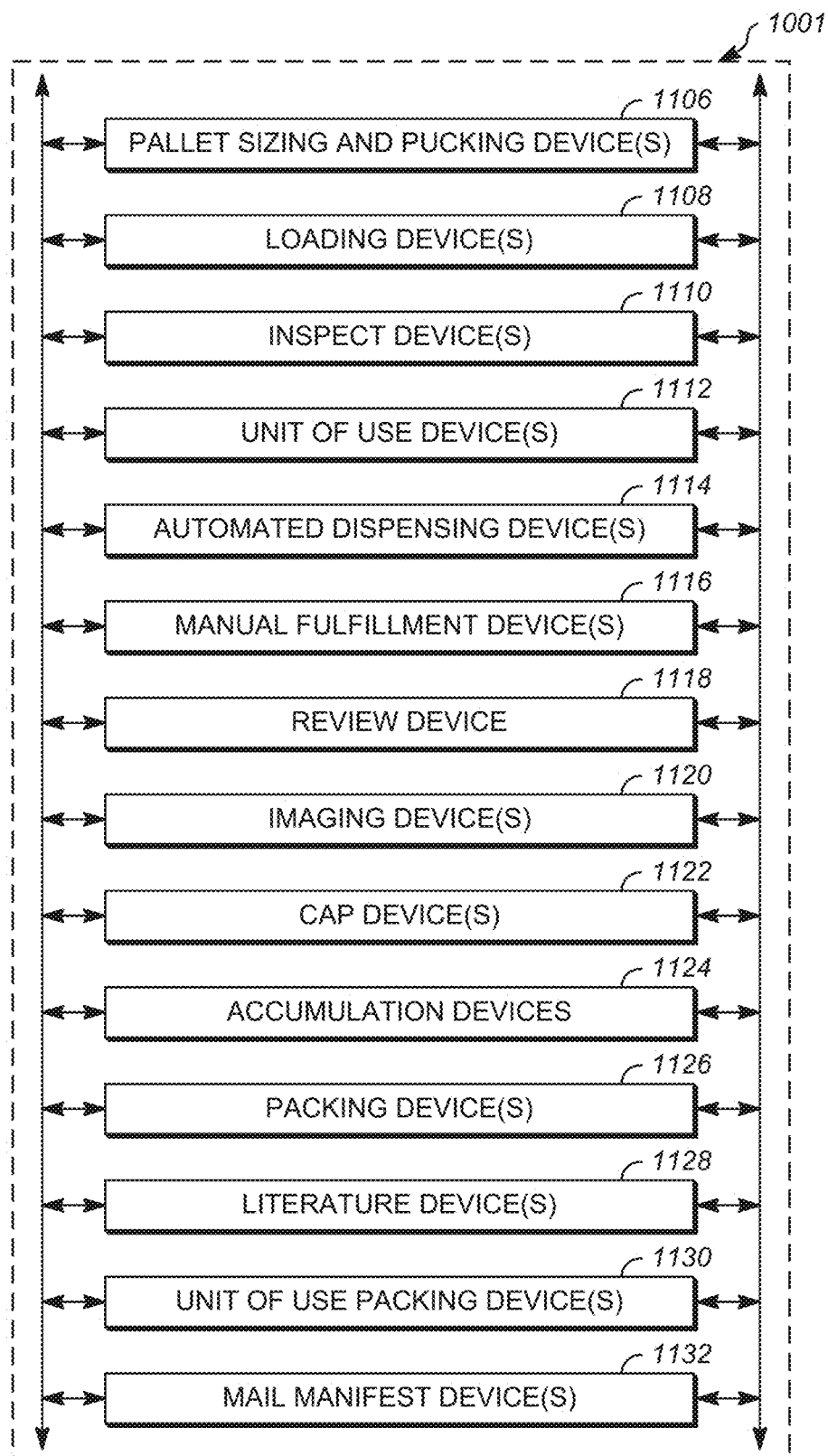
FIG. 13 generally illustrates a pharmacy according to the principles of the present disclosure.

FIG. 13 generally illustrates the pharmacy and testing facility 1001 according to the principles of the present disclosure. The pharmacy and testing facility 1001 may be used to process and fulfill testing kits and testing orders. After fulfillment, the medical package and mat are packed for shipping.

The pharmacy and testing facility 1001 may include devices in communication with a benefit manager device, an order processing device, and the storage device, directly or over the network. Specifically, the pharmacy and testing facility 1001 may include pallet sizing and pucking device(s) 1106, loading device(s) 1108, inspect device(s) 1110, non-degradable testing kit device(s) 1112, automated dispensing device(s) 1114, manual fulfillment device(s) 1116, review devices 1118, imaging device(s) 1120, cap device(s) 1122, accumulation devices 1124, packing device(s) 1126, literature device(s) 1128, unit of use packing device(s) 1130, and mail manifest device(s) 1132. Further, the pharmacy and testing facility 1001 may include additional devices, which may communicate with each other directly or over the network.

In some embodiments, operations performed by one of these devices 1106-1132 may be performed sequentially, or in parallel with the operations of another device as may be coordinated by the order processing device, which may include a dedicated processor in operable communication with a memory. In some embodiments, the order-processing device tracks a testing request based on operations performed by one or more of the devices 1106-1132.

In some embodiments, the pharmacy and testing facility may transport medical containers with testing kits and a mat, for example, among the devices 1106-1132 in the high-volume fulfillment center, by use of pallets. The pallet sizing and pucking device 1106 may configure pucks in a pallet. A pallet may be a transport structure for a number of medical packages, testing kits, and mats (e.g., medical bundle or container), and may include a number of cavities. A puck may be placed in one or more than one of the cavities in a pallet by the pallet sizing and pucking device 1106. The puck may include a receptacle sized and shaped to receive a medical bundle. Such medical bundles may be supported by the pucks during carriage in the pallet. Different pucks may have differently sized and shaped receptacles to accommodate medical bundles of differing sizes, as may be appropriate for testing kits.

The arrangement of pucks in a pallet may be determined by the order processing device based on medical test kits that the order processing device decides to launch. The arrangement logic may be implemented directly in the pallet sizing and pucking device 1106. Once a medical bundle is set to be launched, a puck suitable for the appropriate size of container for that prescription may be positioned in a pallet by a robotic arm or pickers. The pallet sizing and pucking device 1106 may launch a pallet once pucks have been configured in the pallet.

The loading device 1108 may load medical bundles into the pucks on a pallet by a robotic arm, a pick and place mechanism (also referred to as pickers), etc. In various embodiments, the loading device 1108 has robotic arms or pickers to grasp a medical bundle and move it to and from a pallet or a puck. The loading device 1108 may also print a label that is appropriate for a medical bundle that is to be loaded onto the pallet, and apply the label to the medical bundle. The pallet may be located on a conveyor assembly during these operations (e.g., at the high-volume fulfillment center, etc.).

The inspect device 1110 may verify that medical bundles in a pallet are correctly labeled and in the correct spot on the pallet. The inspect device 1110 may scan the label on one or more medical bundle on the pallet. Labels of containers may be scanned or imaged in full or in part by the inspect device 1110. Such imaging may occur after the container has been lifted out of corresponding puck by a robotic arm, picker, etc., or may be otherwise scanned or imaged while retained in the puck. In some embodiments, images and video captured by the inspect device 1110 may be stored in the storage device as order data.

The non-degradable testing kit device 1112 may temporarily store, monitor, label, and dispense certain medical testing kits, drugs, devices that do not degrade. These medical testing kits may be packaged individually or collectively for shipping, or may be shipped in combination with other testing kits dispensed by other devices in the high-volume fulfillment center.

At least some of the operations of the devices 1106-1132 may be directed by the order processing device. For example, the manual fulfillment device 1116, the review device 1118, the automated dispensing device 1114, and the packing device 1126, etc. may receive instructions provided by the order processing device.

The automated dispensing device 1114 may include one or more devices that dispense testing kits, medical packages, and mats in accordance with one or multiple orders. In general, the automated dispensing device 1114 may include mechanical and electronic components with, in some embodiments, software and logic to facilitate dispensing that would otherwise be performed in a manual fashion by a pharmacist and laboratory technician. For example, the automated dispensing device 1114 may include high-volume fillers that fill a medical bundle with the appropriate mat, testing kit, mat, and instructions.

The manual fulfillment device 1116 controls how medical bundles are manually fulfilled. For example, the manual fulfillment device 1116 may receive or obtain a bundle container and enable fulfillment of the container by a pharmacist or laboratory technician. In some embodiments, the manual fulfillment device 1116 provides the filled bundle container to another device in the fulfillment devices to be joined with other bundle containers in a test kit order for a user or member. For example, a testing kit which includes a thermal budget with a testing kit without a thermal budget, medicine, prescriptions, and devices may be filled and joined together for packaging for an initial mailing step to the member, user, and individual associated with the medical package.

In general, manual fulfillment may include operations at least partially performed by a pharmacist or a laboratory technician. For example, a person may retrieve a supply of the test kits, may make an observation, may insure that the test kits, vials, medical packages, and mats are placed in an appropriate bundle container, etc. Some medical packages may vary, for example, the thickness of insulation may be increased for those testing kits associated with a shorter thermal budget. Some portions of the manual fulfillment process may be automated by use of a machine. For example, the folding of the mat, the filling of any vials or other preserving medium for a payload, etc., may be at least partially automated. Medical bundles and related components dispensed by the manual fulfillment device 1116 may be packaged individually or collectively for shipping, or may be shipped in combination with other medical bundles, prescriptions, components, dispensed by other devices in the high-volume fulfillment center.

The review device 1118 may process medical bundles to be reviewed by a pharmacist or laboratory technician for proper instructions, testing verification, an appropriate testing kit etc. Fulfilled testing kits may be manually reviewed and verified by a pharmacist or laboratory technician, as may be required by state or local law. The pharmacist or laboratory technician may also handle medical bundle containers which have been flagged as an exception, such as containers with unreadable labels, containers for which the associated testing order has been canceled, containers with defects, etc. In some embodiments, the manual review may be performed at a manual review station.

The imaging device 1120 may image containers once they have been filled. A medical package that will have a thermal budget may be imaged to ensure the correct coolant is in the package or that there are no defects in the medical package. The images may be transmitted to the order processing device and stored in the storage device as part of the order data. These images may also later be used to verify that the medical package associated with the medical bundle is the same medical package that is later retrieved from the individual associated with the medical package and delivered.

The cap device 1122 may be used to cap or otherwise seal a medical package or medical bundle. In some embodiments, the cap device 1122 may secure the medical package with a type of cap in accordance with which medical packages will be later retrieved by a UAV wherein the cap is provided with the previously described connection device. The cap device 1122 may also etch a message into the cap, although this process may be performed by a subsequent device in the high-volume fulfillment center.

The accumulation device 1124 accumulates various containers of medical bundles in an order. For example, the accumulation device 1124 may accumulate medical bundles from the non-degradable testing kit device 1112, the automated dispensing device 1114, the manual fulfillment device 1116, and the review device 1118. The accumulation device 1124 may be used to group the multiple medical bundles, associated testing kits, medicines, devices prior to shipment to the member. The accumulation device 1124 may also bundle a prescription order with a medical testing kit.

The literature device 1128 prints, or otherwise generates, literature to include with each order. The literature may be printed on multiple sheets of substrates, such as paper, coated paper, printable polymers, or combinations of the above substrates. The literature printed by the literature device 1128 may include information required to accompany the test kit included in an order, other information related to the scheduling and retrieval of the medical package, financial information associated with the order (for example, an invoice or an account statement), etc.

In some embodiments, the literature device 928 folds or otherwise prepares the literature for inclusion with a prescription drug order (e.g., in a shipping container). In other embodiments, the literature device 928 prints the literature and is separate from another device that prepares the printed literature for inclusion with a prescription order.

The packing device 1126 packages the order in preparation for shipping the order. The packing device 1126 may box, bag, or otherwise package the fulfilled order for delivery. The packing device 1126 may place inserts (e.g., literature or other papers, etc.) into the medical bundle packaging received from the literature device 1128. For example, some orders may be shipped in a box, while other orders may be shipped in a bag, which may be a wrap seal bag.

The packing device 1126 may label the box, bag, or medical container with an address and a recipient's name. The label may be printed and affixed to the box, bag, or medical container or be printed directly onto the bag or box, or otherwise associated with the bag or box. The packing device 1126 may sort the box, bag, or medical container for mailing in an efficient manner (e.g., sort by delivery address, etc.). The packing device 1126 may include ice or temperature sensitive elements that are to be kept within a temperature range during shipping (for example, this may be necessary in order to retain efficacy) and that are to be cooled or heated prior to retrieval. The ultimate package may then be shipped through postal mail, through a mail order delivery service that ships via ground and air (e.g., UPS, FEDEX, or DHL, etc.), through a delivery service, through a locker box at a shipping site (e.g., AMAZON locker or a PO Box, etc.), or otherwise to a delivery location. Some packages will be delivered using autonomous delivery vehicles, e.g., ground vehicles or aircraft, to the delivery location.

The non-degradable testing kit packing device 1130 packages a non-degradable testing kit, medicine, or device order in preparation for shipping the order. The non-degradable testing kit packing device 1130 may include manual scanning of containers to be bagged for shipping to verify each container in the order. In an example embodiment, the manual scanning may be performed at a manual scanning station. A mail manifest device 1132 may print mailing labels used by the packing device 1126 and may print shipping manifests and packing lists.

Multiple devices may share processing and memory resources. The devices 1106-1132 may be located in the same area or in different locations. For example, the devices 1106-1132 may be located in a building or set of adjoining buildings. The devices 1106-1132 may be interconnected (such as by conveyors), networked, and otherwise in contact with one another or integrated with one another (e.g., at the high-volume fulfillment center, etc.). In addition, the functionality of a device may be split among a number of discrete devices and combined with other devices.

Figure 14:
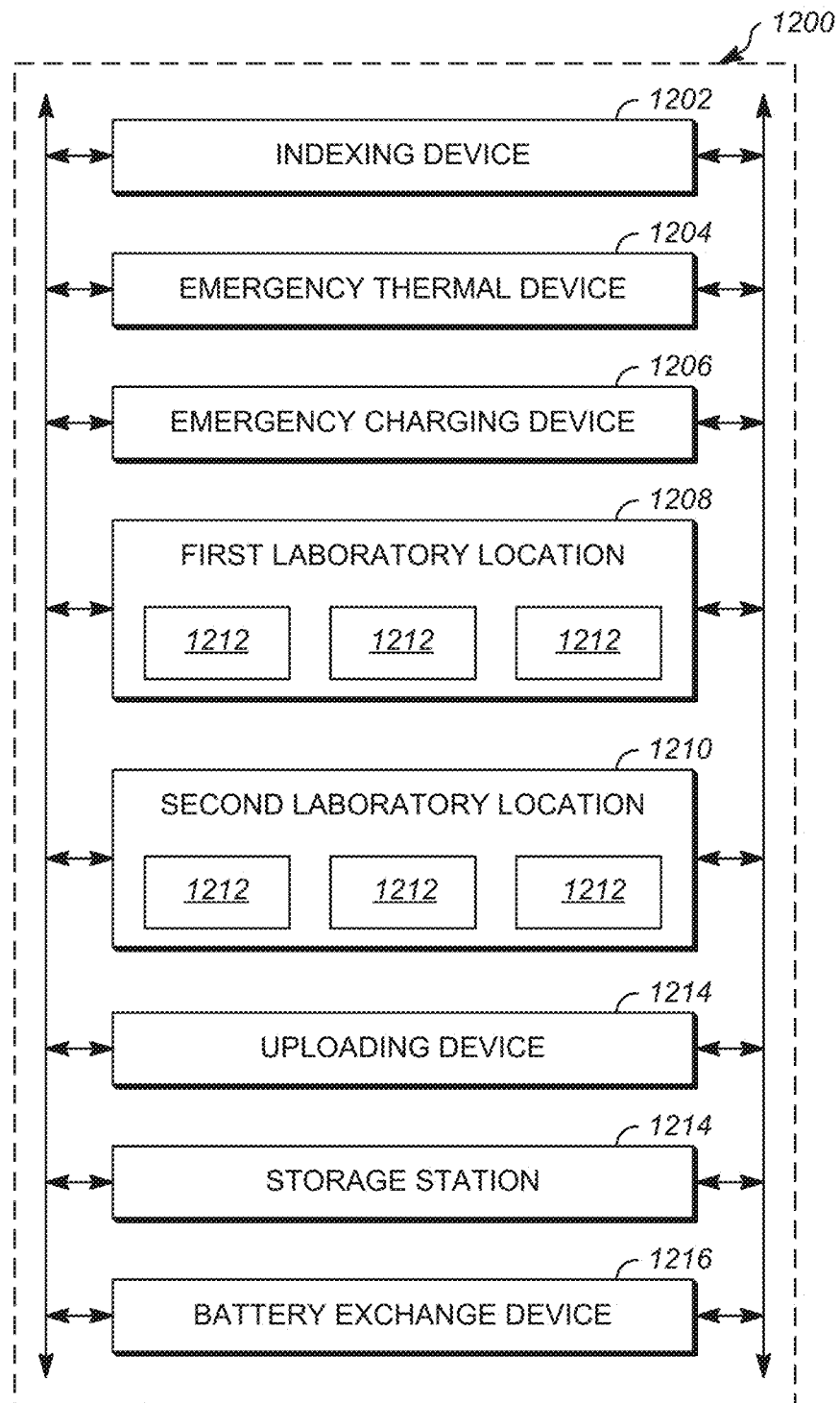
FIG. 14 generally illustrates a delivery location according to the principles of the present disclosure.

FIG. 14 generally illustrates the delivery location 1200, which may be similarly located at the pharmacy and testing facility 1001 and functions of which may be facilitated by system 1000, computing device 100, system 200, or other means. The delivery location may include an indexing device 1202 that tracks incoming deliveries from one or more UAVs 10, 10'. The indexing device 1202 may associate each UAV with a medical package as it is retrieved and may otherwise be capable of reading identifiers on the medical package that may have been previous placed by packing device 1126. The indexing device 1202 may organize the incoming UAVs 10, 10' and medical packages based on a combination of the remaining thermal budget, the remaining power budget, the optimal temperature conditions, and the end destination. For example, if the indexing device 1202 determines that a medical package is near the end of a thermal budget, the UAV may be instructed to deliver the medical package to an emergency thermal device 1204 to quickly change the temperature of the medical package. Similarly, if the indexing device 1202 determines that a UAV is near the end of a power budget, the UAV may be instructed to travel to an emergency charging device 1206 to quickly provide additional power budget. The emergency charging device 1206 may not fully charge the UAV 10 but instead may only charge the UAV 10 enough to complete a delivery and return to a hub and other UAV storage system. The emergency thermal device 1204 and the emergency charging device 1206 may be located in the same area. Moreover, there may be an emergency thermal device 1204 for cooling and an emergency thermal device 1204 for heating, both of which may include an emergency charging device 1206.

With continued reference to FIG. 14, the indexing device 1202 may determine that the medical package is associated with a first testing laboratory location 1208, a second testing laboratory location 1210, etc. In addition to identifying the respective laboratory location, the indexing device 1202 may note thermal guidelines associated with a given medical package. As such, each laboratory location may include one or more distinct thermal areas 1212 corresponding to ideal temperatures for one or more tests associated with a given laboratory. The UAV may be instructed to deliver the package directly to the given thermal area 1212 or may alternatively be instructed to travel to an unloading device 1214, which may include similar components of the loading device 1108 or utilize manual technicians, whereafter the medical packages can be delivered to the appropriate thermal location 1212 and laboratory location 1210. Alternatively, the UAV may actuate the engaging member to deliver directly to a location. It should be appreciated that the unloading device 1214 may be in any of the previously described locations and devices 1204-1214. Moreover, the UAV, at any time in 1200 may be instructed to travel to a battery exchange device 1216, which may be located at any of the previously described locations and devices 1204-1214. As such, instead of charging, the system may provide an automatic or manual battery exchange, wherein a charged battery is exchanged for a depleted battery and the depleted battery is placed at a charging station. The various locations herein may be provided with grid patterns by which the indexing device 1202 may easily schedule delivery/landing of the UAV based on grid module availability.

Once the medical package is no longer on the UAV, the UAV may then travel to a hub or storage station 1216, which may include one or more charging devices. It should be appreciated that in some embodiments the first testing laboratory location 1208 and the second testing laboratory location 1210 may be located at the specific laboratories and that the emergency devices are located between the relevant retrieval location and the specific laboratories.

In some embodiments, a method for controlling an autonomous unmanned aerial vehicle for receiving a medical package is provided. The method includes receiving location information corresponding to a location of a medical package. The method includes providing preparation information to an individual associated with the medical package, the preparation information indicating, at least, a position at the location of the medical package to arrange a retrieval mat and the medical package. The method includes identifying a three-dimensional flight path between a starting location and the location of the medical package. The method includes traversing, using the unmanned aerial vehicle, the three-dimensional flight path. The method includes identifying, using an image-capturing device of the unmanned aerial vehicle, at least one characteristic of the retrieval mat and determining a location of the medical package on the retrieval mat using the at least one characteristic of the retrieval mat. The method includes performing a first attempt to engage a portion of the medical package using an engaging member of the unmanned aerial vehicle. In response to a determination that the first attempt to engage the portion of the medical package using the engaging member of the unmanned aerial vehicle is successful, the method includes traversing a three-dimensional flight path between the location of the medical package and a delivery location.

In some embodiments, the method includes a retrieval mat including at least one indicator that indicates at least one of the locations of the retrieval mat and the position of the medical package on the retrieval mat.

In some embodiments, the at least one indicator of the retrieval mat includes a color of the retrieval mat.

In some embodiments, the method includes determining a thermal control period of the medical package, wherein the preparation information further indicates a period for retrieval of the medical package, wherein the period corresponds to the thermal control period.

In some embodiments, the method includes updating the thermal control period in response to the arrival of the unmanned aerial vehicle at the location of the medical package, wherein the thermal control period is updated based on a condition of the medical package.

In some embodiments, the method includes updating the thermal control period based on at least one environmental factor that includes at least one weather value at the location of the medical package.

In some embodiments, the method includes in response to a determination that the first attempt to engage the portion of the medical package using the engaging member of the unmanned aerial vehicle is unsuccessful, rotating the unmanned aerial vehicle a first predetermined value and performing a second attempt to engage the portion of the medical package using the engaging member of the unmanned aerial vehicle.

In some embodiments, the method includes in response to a determination that the second attempt to engage the portion of the medical package using the engaging member of the unmanned aerial vehicle is unsuccessful, rotating the unmanned aerial vehicle a second predetermined value and performing a third attempt to engage the portion of the medical package using the engaging member of the unmanned aerial vehicle, wherein the second predetermined value is less than the first predetermined value.

In some embodiments, the method includes determining a power budget of the unmanned aerial vehicle, wherein the preparation information further indicates a period for retrieval of the medical package, wherein the period corresponds to the power budget.

In some embodiments, the method includes providing preparation information that includes a digital rendering of a map of the location of the medical package and an indicator on the digital rendering of the map indicating the position at the location of the medical package to arrange a retrieval mat and the medical package.

In some embodiments, the method includes determining, prior to traversing, using the unmanned aerial vehicle, the three-dimension flight path between the starting location and the location of the medical package, whether a confirmation was received indicating the medical package is in the position in the location of the medical package.

In some embodiments, the method includes generating a notification indicating that the medical package was successfully retrieved.

In some embodiments, an apparatus for controlling unmanned flight retrieval of a medical package is provided. The apparatus comprises a processor and a memory that includes instructions that, when executed by the processor, cause the processor to perform a number of tasks. The processor may be caused to receive location information corresponding to a location of a medical package. The processor may be further caused to provide preparation information to an individual associated with the medical package, the preparation information indicating, at least, a position at the location of the medical package to arrange a retrieval mat and the medical package. The processor may be further caused to identify a three-dimensional flight path between a starting location and the location of the medical package. The processor may be further caused to traverse, using the unmanned aerial vehicle, the three-dimensional flight path; identify, using an image-capturing device of the unmanned aerial vehicle, at least one characteristic of the retrieval mat. The processor may be further caused to perform a first attempt to engage a portion of the medical package using an engaging member of the unmanned aerial vehicle. The processor may be further caused to, in response to a determination that the first attempt to engage the portion of the medical package using the engaging member of the unmanned aerial vehicle is unsuccessful, rotate the unmanned aerial vehicle a first predetermined number of degrees and perform a second attempt to engage a portion of the medical package using an engaging member of the unmanned aerial vehicle.

In some embodiments, the processor may be further caused to, in response to a determination that the second attempt to engage the portion of the medical package using the engaging member of the unmanned aerial vehicle is unsuccessful, rotate the unmanned aerial vehicle a second predetermined number of degrees and perform a third attempt to engage a portion of the medical package using an engaging member of the unmanned aerial vehicle, wherein the second predefined number of degrees is less than the first predefined number of degrees.

In some embodiments, the processor may be further caused to identify, using an image-capturing device of the unmanned aerial vehicle, a position indicator of the retrieval mat to predict a location of the medical package on the retrieval mat.

In some embodiments, the processor may be further caused to identify, using an image-capturing device of the unmanned aerial vehicle, a position indicator of the retrieval mat to predict an orientation of the medical package on the retrieval mat.

In some embodiments, the processor may be further caused to generate a notification on a mobile computing device associated with the individual associated with the medical package that the unmanned aerial vehicle has arrived at the location of the medical package.

In some embodiments, the processor may be further caused to, in response to a determination that the first attempt to engage the portion of the medical package using the engaging member of the unmanned aerial vehicle is successful, cause the unamend aerial vehicle to traverse a three-dimensional flight path between the location of the medical package and a delivery location, wherein the delivery location is thermally controlled.

In some embodiments, a system for retrieval and delivery of a medication package is provided. The system comprises a retrieval mat including at least one characteristic, a medical package including a payload, an unmanned aerial vehicle including an engaging member, at least one processor, and at least one memory that includes instructions that, when executed by the at least one processor, cause the at least one processor to perform a number of tasks. The processor may be caused to receive location information corresponding to a location of the medical package. The processor may be further caused to provide preparation information to an individual associated with the medical package, the preparation information indicating, at least, a position at the location of the medical package to arrange the retrieval mat and the medical package. The processor may be further caused to identify a three-dimensional flight path between a starting location and the location of the medical package. The processor may be further caused to traverse, using the unmanned aerial vehicle, the three-dimensional flight path. The processor may be further caused to identify, using an image-capturing device of the unmanned aerial vehicle, the at least one characteristic of the retrieval mat. The processor may be further caused to determine a location of the retrieval mat using the at least one characteristic of the retrieval mat. The processor may be further caused to determine a location of the medical package on the retrieval mat using the at least one characteristic of the retrieval mat. The processor may be further caused to determine an orientation of the medical package on the retrieval mat using the at least one characteristic of the retrieval mat. The processor may be further caused to, in response to a determination of the location and orientation of the medical package on the retrieval mat, position the unmanned aerial vehicle over the medical package, orient the unmanned aerial vehicle with respect to the medical package, and perform a first attempt to engage a portion of the medical package using the engaging member of the unmanned aerial vehicle. The processor may be further caused to, in response to a determination that the first attempt to engage the portion of the medical package using the engaging member of the unmanned aerial vehicle is successful, traverse a three-dimensional flight path between the location of the medical package and a delivery location.

In some embodiments, the system further includes a mobile device of the individual associated with the medical package and wherein the processor is further caused to generate a notification on the mobile device of a position of the unmanned aerial vehicle.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy under-standing of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for controlling an autonomous unmanned aerial vehicle for receiving a medical package, the method comprising:
    receiving location information corresponding to a first location of the medical package;
    providing preparation information to an individual associated with the medical package, the preparation information indicating, at least, a position at the location of the medical package to arrange a retrieval mat and the medical package;
    identifying a three-dimensional flight path between a starting location and the location of the medical package;
    traversing, using the unmanned aerial vehicle, the three-dimensional flight path, wherein the unmanned aerial vehicle comprises at least a body and an engaging member;
    identifying, using an image-capturing device of the unmanned aerial vehicle, at least one characteristic of the retrieval mat;
    determining a location of the retrieval mat using the at least one characteristic of the retrieval mat;
    performing a first attempt to engage a portion of the medical package using the engaging member of the unmanned aerial vehicle, based on the location of the retrieval mat;
    in response to a determination that the first attempt to engage the portion of the medical package using the engaging member of the unmanned aerial vehicle is unsuccessful, rotating the body of the unmanned aerial vehicle a first predetermined number of degrees and performing a second attempt to engage the portion of the medical package using the engaging member; and
    in response to a determination that the second attempt to engage the portion of the medical package using the engaging member of the unmanned aerial vehicle is successful, traversing a second three-dimensional flight path between the location of the medical package and a delivery location.

2. The method of claim 1, wherein the at least one characteristic of the retrieval mat indicates at least one of the location of the retrieval mat, a position of the medical package on the retrieval mat, and an orientation of the medical package on the retrieval mat.

3. The method of claim 1, wherein the at least one characteristic of the retrieval mat includes a color of the retrieval mat.

4. The method of claim 1, further comprising determining a thermal control period of the medical package, wherein the preparation information further indicates a period for retrieval of the medical package, and wherein the period for retrieval corresponds to the thermal control period.

5. The method of claim 4, further comprising updating the thermal control period in response to the arrival of the unmanned aerial vehicle at the location of the medical package, wherein the thermal control period is updated based on a condition of the medical package.

6. The method of claim 4, further comprising updating the thermal control period based on at least one environmental factor that includes at least one weather value at the location of the medical package.

7. The method of claim 1, further comprising, in response to a determination that the second attempt to engage the portion of the medical package using the engaging member of the unmanned aerial vehicle is unsuccessful, rotating the body of the unmanned aerial vehicle a second predetermined value and performing a third attempt to engage the portion of the medical package using the engaging member of the unmanned aerial vehicle, wherein the second predetermined value is less than the first predetermined value.

8. The method of claim 1, further comprising determining a power budget of the unmanned aerial vehicle, wherein the preparation information further indicates a period for retrieval of the medical package, wherein the period corresponds to the power budget.

9. The method of claim 1, wherein preparation information includes a digital rendering of a map of the location of the medical package and an indicator on the digital rendering of the map indicating the position at the location of the medical package to arrange a retrieval mat and the medical package.

10. The method of claim 1, further comprising determining, prior to traversing, using the unmanned aerial vehicle, the three-dimensional flight path between the starting location and the location of the medical package, whether a confirmation was received indicating the medical package is in the position in the location of the medical package.

11. The method of claim 1, further comprising generating a notification indicating that the medical package was successfully retrieved.

12. An apparatus for controlling unmanned flight retrieval of a medical package, the apparatus comprising:
    a processor; and
    a memory that includes instructions that, when executed by the processor, cause the processor to:
        receive location information corresponding to a location of a medical package;
        provide preparation information to an individual associated with the medical package, the preparation information indicating, at least, a position at the location of the medical package to arrange a retrieval mat and the medical package;
        identify a three-dimensional flight path between a starting location and the location of the medical package;
        traverse the three-dimensional flight path, using an unmanned aerial vehicle comprising at least a body and an engaging member;
        identify, using an image-capturing device of the unmanned aerial vehicle, at least one characteristic of the retrieval mat;
        perform a first attempt to engage a portion of the medical package using the engaging member of the unmanned aerial vehicle, based on the at least one characteristic; and
        in response to a determination that the first attempt to engage the portion of the medical package using the engaging member of the unmanned aerial vehicle is unsuccessful, rotate the body of the unmanned aerial vehicle a first predetermined number of degrees and perform a second attempt to engage a portion of the medical package using an engaging member of the unmanned aerial vehicle.

13. The apparatus of claim 12, wherein the processor is further caused to, in response to a determination that the second attempt to engage the portion of the medical package using the engaging member of the unmanned aerial vehicle is unsuccessful, rotate the unmanned aerial vehicle a second predetermined number of degrees and perform a third attempt to engage a portion of the medical package using an engaging member of the unmanned aerial vehicle, wherein the second predefined number of degrees is less than the first predefined number of degrees.

14. The apparatus of claim 12, wherein the processor is further caused to identify, using the image-capturing device of the unmanned aerial vehicle, a position indicator of the retrieval mat to predict a location of the medical package on the retrieval mat, wherein the at least one characteristic includes the position indicator.

15. The apparatus of claim 12, wherein the processor is further caused to identify, using the image-capturing device of the unmanned aerial vehicle, a position indicator of the retrieval mat to predict an orientation of the medical package on the retrieval mat, wherein the at least one characteristic includes the position indicator.

16. The apparatus of claim 12, wherein the processor is further caused to generate a notification on a mobile computing device associated with the individual associated with the medical package that the unmanned aerial vehicle has arrived at the location of the medical package.

17. The apparatus of claim 12, wherein the processor is further caused to, in response to a determination that the first attempt to engage the portion of the medical package using the engaging member of the unmanned aerial vehicle is successful, cause the unmanned aerial vehicle to traverse a second three-dimensional flight path between the location of the medical package and a delivery location, wherein the delivery location is thermally controlled.

18. A system for retrieval and delivery of a medication package, the system comprising:
 a retrieval mat including at least one characteristic;
 a medical package including a payload;
 an unmanned aerial vehicle including at least a body and an engaging member;
 at least one processor; and
 at least one memory that includes instructions that, when executed by the at least one processor, cause the at least one processor to:
  receive location information corresponding to a location of the medical package;
  provide preparation information to an individual associated with the medical package, the preparation information indicating, at least, a position at the location of the medical package to arrange the retrieval mat and the medical package;
  identify a three-dimensional flight path between a starting location and the location of the medical package;
  traverse, using the unmanned aerial vehicle, the three-dimensional flight path;
  identify, using an image-capturing device of the unmanned aerial vehicle, the at least one characteristic of the retrieval mat;
  determine a location of the retrieval mat using the at least one characteristic of the retrieval mat;
  determine a position of the medical package on the retrieval mat using the at least one characteristic of the retrieval mat;
  determine an orientation of the medical package on the retrieval mat using the at least one characteristic of the retrieval mat;
  in response to determining the location of the retrieval mat, the position of the medical package on the retrieval mat, and the orientation of the medical package on the retrieval mat,
   position the unmanned aerial vehicle over the medical package,
   orient the unmanned aerial vehicle with respect to the medical package, and
   perform a first attempt to engage a portion of the medical package using the engaging member of the unmanned aerial vehicle;
  in response to a determination that the first attempt to engage the portion of the medical package using the engaging member of the unmanned aerial vehicle is unsuccessful,
   rotate the body of the unmanned aerial vehicle a first predetermined number of degrees, and
   perform a second attempt to engage the portion of the medical package using the engaging member; and
  in response to a determination that the second attempt to engage the portion of the medical package using the engaging member of the unmanned aerial vehicle is successful, traverse a second three-dimensional flight path between the location of the medical package and a delivery location.

19. The system of claim 18, wherein the system further includes a mobile device of the individual associated with the medical package and wherein the processor is further caused to generate a notification on the mobile device of a second position of the unmanned aerial vehicle.

* * * * *